(12) United States Patent
Sekii et al.

(10) Patent No.: US 8,724,257 B2
(45) Date of Patent: May 13, 2014

(54) HYDRODYNAMIC BEARING APPARATUS AND SPINDLE MOTOR AND DISK DRIVE APPARATUS INCLUDING THE SAME

(71) Applicants: Yoichi Sekii, Kyoto (JP); Hiroshi Konno, Kyoto (JP); Chiharu Fujii, Kyoto (JP)

(72) Inventors: Yoichi Sekii, Kyoto (JP); Hiroshi Konno, Kyoto (JP); Chiharu Fujii, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/790,089

(22) Filed: Mar. 8, 2013

(65) Prior Publication Data

US 2014/0078617 A1    Mar. 20, 2014

(30) Foreign Application Priority Data

Sep. 18, 2012 (JP) ................................. 2012-203804

(51) Int. Cl.
*G11B 19/20* (2006.01)
*F16C 32/06* (2006.01)

(52) U.S. Cl.
USPC ................ 360/99.08; 310/90.5; 384/107

(58) Field of Classification Search
USPC .......... 360/99.08, 99.04, 98.07; 310/90, 90.5; 384/107, 112, 119
See application file for complete search history.

(56) References Cited

U.S. PATENT DOCUMENTS

| | | |
|---|---|---|
| 5,533,811 A | 7/1996 | Polch et al. |
| 5,558,443 A | 9/1996 | Zang |
| 6,211,592 B1 | 4/2001 | Ichiyama |
| 6,246,136 B1 | 6/2001 | Ichiyama |
| 2004/0090702 A1 | 5/2004 | Aiello et al. |
| 2004/0096131 A1 | 5/2004 | Aiello et al. |
| 2004/0156568 A1 | 8/2004 | Woldemar et al. |
| 2004/0165797 A1 | 8/2004 | Oku et al. |
| 2004/0175062 A1 | 9/2004 | Nishimura et al. |
| 2005/0031237 A1 | 2/2005 | Gomyo et al. |
| 2005/0111769 A1 | 5/2005 | Haga |
| 2005/0225187 A1 | 10/2005 | Hafen et al. |
| 2006/0002638 A1 | 1/2006 | Ichiyama |
| 2006/0002641 A1 | 1/2006 | Ichiyama |
| 2006/0039634 A1 | 2/2006 | Ichiyama |

(Continued)

FOREIGN PATENT DOCUMENTS

| | | |
|---|---|---|
| JP | 06-028335 U | 4/1994 |
| JP | 06-121484 A | 4/1994 |

(Continued)

OTHER PUBLICATIONS

Kimura et al., "Dynamic Pressure Bearing and Spindle Motor Using the Same", U.S. Appl No. 12/952,223, filed Nov. 23, 2010.

(Continued)

*Primary Examiner* — Brian Miller
(74) *Attorney, Agent, or Firm* — Keating & Bennett, LLP

(57) ABSTRACT

A bearing apparatus includes an upper annular portion that has a circular or substantially circular ring shape, and is arranged to project radially outward from a stationary shaft. One of an upper surface of a sleeve and a lower surface of the upper annular portion includes a first pumping groove array arranged to send a lubricating oil radially inward. The sleeve includes a second inner circumferential surface arranged radially outside of the upper annular portion. One of a lower surface of a cap, an upper surface of the upper annular portion, the second inner circumferential surface, and an outer circumferential surface of the upper annular portion includes a second pumping groove array arranged to send the lubricating oil radially outward or axially downward.

16 Claims, 16 Drawing Sheets

(56) References Cited

U.S. PATENT DOCUMENTS

| | | |
|---|---|---|
| 2006/0039636 A1 | 2/2006 | Ichiyama |
| 2006/0051001 A1 | 3/2006 | Nishimura et al. |
| 2006/0210205 A1 | 9/2006 | Engesser et al. |
| 2006/0222276 A1 | 10/2006 | Uenosono |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0006332 A1 | 1/2008 | Ishizawa et al. |
| 2008/0056104 A1 | 3/2008 | Nishimura et al. |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |
| 2010/0124387 A1 | 5/2010 | Fuss et al. |

FOREIGN PATENT DOCUMENTS

| | | |
|---|---|---|
| JP | 07-336924 A | 12/1995 |
| JP | 2002-005171 A | 1/2002 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-226388 A | 8/2006 |
| JP | 2009-041671 A | 2/2009 |
| JP | 2009-133361 A | 6/2009 |
| JP | 2011-002024 A | 1/2011 |
| WO | 20061120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.

Oe et al., "Bearing Apparatus, Spindle Motor, and Disk Drive Apparatus", U.S. Appl. No. 12/793,851, filed Jun. 4, 2010.

Yamada et al., "Fluid Dynamic Bearing Apparatus, Spindle Motor, and Disk Drive Apparatus", U.S. Appl. No. 12/742,931, filed May 14, 2010.

Yamada et al., "Fluid Dynamic Bearing Apparatus, Spindle Motor, and Disk Drive Apparatus", U.S. Appl. No. 12/899,658, filed Oct. 7, 2010.

Yamada et al., "Fluid Dynamic Bearing Apparatus, Spindle Motor, and Disk Drive Apparatus", U.S. Appl. No. 13/299,542, filed Nov. 18, 2011.

Kimura et al., "Bearing Apparatus, Spindle Motor, and Disk Drive Apparatus", U.S. Appl. No. 13/602,420, filed Sep. 4, 2012.

Kimura et al., "Bearing Apparatus, Spindle Motor, and Disk Drive Apparatus", U.S. Appl. No. 13/681,500, filed Nov. 20, 2012.

Kimura et al., "Bearing Apparatus, Spindle Motor, and Disk Drive Apparatus", U.S. Appl. No. 13/602,348, filed Sep. 4, 2012.

Iwasaki et al., "Motor and Disk Drive Apparatus", U.S. Appl. No. 13/613,109, filed Sep. 13, 2012.

Tamaoka et al., "Motor and Disk Drive Apparatus", U.S. Appl. No. 13/613,106, filed Sep. 13, 2012.

Iwasaki et al., "Motor and Disk Drive Apparatus", U.S. Appl. No. 13/613,108, filed Sep. 13, 2012.

Sekii et al., "Spindle Motor and Disk Drive Apparatus", U.S. Appl. No. 13/767,205, filed Feb. 14, 2013.

Sekii et al., "Bearing Apparatus, Spindle Motor, and Disk Drive Apparatus", U.S. Appl. No. 13/789,796, filed Mar. 8, 2013.

Fukushiima, "Motor and Disk Drive Apparatus," U.S. Appl. No. 13/751,380, filed Jan. 28, 2013.

Sato et al., "Spindle Motor and Disk Drive Apparatus", U.S. Appl. No. 13/798,857, filed Mar. 13, 2013.

Sekii, "Motor and Disk Drive Apparatus", U.S. Appl. No. 13/886,290, filed May 3, 2013.

Watanabe et al., "Spindle Motor and Disk Drive Apparatus", U.S. Appl. No. 13/898,921, filed May 21, 2013.

Kimura et al., "Bearing Mechanism, Motor, and Disk Drive Apparatus", U.S. Appl. No. 13/775,475, filed Feb. 25, 2013.

Sumiji et al., "Bearing Mechanism, Motor, and Disk Drive Apparatus", U.S. Appl. No. 13/775,467, filed Feb. 25, 2013.

Sumiji et al., "Bearing Mechanism, Motor, and Disk Drive Apparatus", U.S. Appl. No. 13/785,297, filed Mar. 5, 2013.

English translation of Official Communication issued in International Patent Application No. PCT/JP2009/059556, mailed on Jan. 20, 2011.

HYDRODYNAMIC BEARING APPARATUS AND SPINDLE MOTOR AND DISK DRIVE APPARATUS INCLUDING THE SAME

BACKGROUND OF THE INVENTION

1. Field of the Invention

The present invention relates to a bearing apparatus, a spindle motor, and a disk drive apparatus.

2. Description of the Related Art

Spindle motors arranged to rotate disks about central axes thereof are typically installed in hard disk apparatuses and optical disk apparatuses. Such spindle motors include a stationary portion fixed to a housing of the apparatus, and a rotating portion arranged to rotate while supporting the disk (s). The spindle motor is arranged to produce a torque centered on the central axis by magnetic flux generated between the stationary and rotating portions, whereby the rotating portion is caused to rotate with respect to the stationary portion.

The stationary and rotating portions of the spindle motor are joined to each other through a bearing apparatus. In recent years, in particular, spindle motors have often been provided with a bearing apparatus in which a lubricating fluid is arranged between the stationary and rotating portions. The structure of a known bearing apparatus using the lubricating fluid is described, for example, in JP-A 2009-136143.

In some bearing apparatuses using the lubricating fluid, a pumping seal including a plurality of grooves is arranged in the vicinity of a surface of the lubricating fluid. Once the spindle motor is started, the pumping seal causes a portion of the lubricating fluid which is near the surface of the lubricating fluid to be drawn inward toward an interior of the bearing apparatus. This contributes to preventing the lubricating fluid from leaking out of the bearing apparatus. JP-A 2009-136143 notes that a pumping seal characterized in having a pumping structure including grooves arranged in a spiral pattern is located between a surface in a rotor component and a surface in a bearing component (see paragraph [0023] and FIG. 1 of JP-A 2009-136143).

In the case of the structure described in JP-A 2009-136143, however, if the area of the pumping seal is increased to increase an effect of the pumping seal, the radial dimension of the bearing apparatus is increased accordingly. Moreover, members which together define the pumping seal are also accordingly increased in radial dimension. This leads to an increase in a loss of torque in the bearing apparatus.

SUMMARY OF THE INVENTION

A bearing apparatus according to a preferred embodiment of the present invention includes a stationary shaft, an upper annular portion, a lower annular portion, a sleeve, a cap, and a lubricating oil. The stationary shaft is arranged to extend along a central axis extending in a vertical direction. The upper annular portion preferably has a circular or substantially circular ring shape, and is arranged to project radially outward from the stationary shaft. The lower annular portion preferably has a circular or substantially circular ring shape, and is arranged to project radially outward from the stationary shaft below the upper annular portion. The sleeve is arranged between the upper and lower annular portions, and is supported to be rotatable about the central axis. The cap is arranged above the upper annular portion, and is arranged to rotate together with the sleeve. The lubricating oil is arranged between a combination of the sleeve and the cap and a combination of the stationary shaft, the upper annular portion, and the lower annular portion. The lower annular portion includes a bottom plate portion and a wall portion. The bottom plate portion is arranged to extend in or substantially in a shape of a disk below the sleeve. The wall portion is arranged to extend upward from the bottom plate portion to assume a cylindrical or substantially cylindrical shape radially outside of the sleeve. The sleeve includes a first inner circumferential surface, a second inner circumferential surface, an upper surface, a lower surface, and an outer circumferential surface. The first inner circumferential surface is arranged radially opposite to an outer circumferential surface of the stationary shaft. The second inner circumferential surface is arranged radially outside of the upper annular portion. The upper surface is arranged axially opposite to a lower surface of the upper annular portion. The lower surface is arranged axially opposite to an upper surface of the bottom plate portion. The outer circumferential surface is arranged radially opposite to an inner circumferential surface of the wall portion. An upper surface of the upper annular portion and a lower surface of the cap are arranged to together define an upper capillary seal portion arranged to gradually increase in axial dimension with decreasing distance from the central axis. The outer circumferential surface of the sleeve and the inner circumferential surface of the wall portion are arranged to together define a lower capillary seal portion arranged to gradually increase in radial dimension with increasing height. The sleeve includes an upper opening defined in the upper surface thereof, a lower opening defined below the upper opening, and a communicating hole arranged to connect the upper and lower openings with each other. The lower surface of the sleeve and the upper surface of the bottom plate portion are arranged to together define a thrust dynamic pressure bearing portion therebetween. The lower opening is arranged radially outward of an inner circumferential portion of the thrust dynamic pressure bearing portion. A radially outer edge of the lower opening is arranged at a radial position overlapping with an outer circumferential portion of the thrust dynamic pressure bearing portion, or radially outward of the outer circumferential portion of the thrust dynamic pressure bearing portion. At least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during rotation of the sleeve. One of the upper surface of the sleeve and the lower surface of the upper annular portion includes a first pumping groove array arranged to send the lubricating oil radially inward. One of the lower surface of the cap, the upper surface of the upper annular portion, the second inner circumferential surface, and an outer circumferential surface of the upper annular portion includes a second pumping groove array arranged to send the lubricating oil radially outward or axially downward, the second pumping groove array being arranged radially outward of the upper capillary seal portion. The upper opening is arranged radially inward of a radially outer end portion of the first pumping groove array. Both an axial distance between the first pumping groove array and a surface opposed thereto and a distance between the second pumping groove array and a surface opposed thereto are longer than an axial dimension of the thrust dynamic pressure bearing portion.

According to the above-described preferred embodiment of the present invention, a reduction in the distance between each pumping groove array and the central axis is achieved while sufficient effects of pumping seals are secured. In addition, a reduction in radial dimension of the upper annular portion is achieved. This leads to a reduction in a loss of a torque.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a bearing apparatus is referred to by the term "axial direction", "axial", or "axially", that directions perpendicular to the central axis of the bearing apparatus are each referred to by the term "radial direction", "radial", or "radially", and that a direction along a circular arc centered on the central axis of the bearing apparatus is referred to by the term "circumferential direction", "circumferential", or "circumferentially". It is also assumed herein that a vertical direction is the axial direction, and that a side on which a sleeve is arranged with respect to a bottom plate portion of a lower annular portion is defined as an upper side. The shape of each member or portion and relative positions of different members or portions will be described based on the above assumptions. It should be noted, however, that the above definitions of the vertical direction and the upper and lower sides are not meant to restrict in any way the orientation of a bearing apparatus, a spindle motor, or a disk drive apparatus according to any preferred embodiment of the present invention when in use.

Also note that the wording "parallel direction" as used herein comprehends both parallel and substantially parallel directions. Also note that the wording "perpendicular direction" as used herein comprehends both perpendicular and substantially perpendicular directions.

Figure 1:
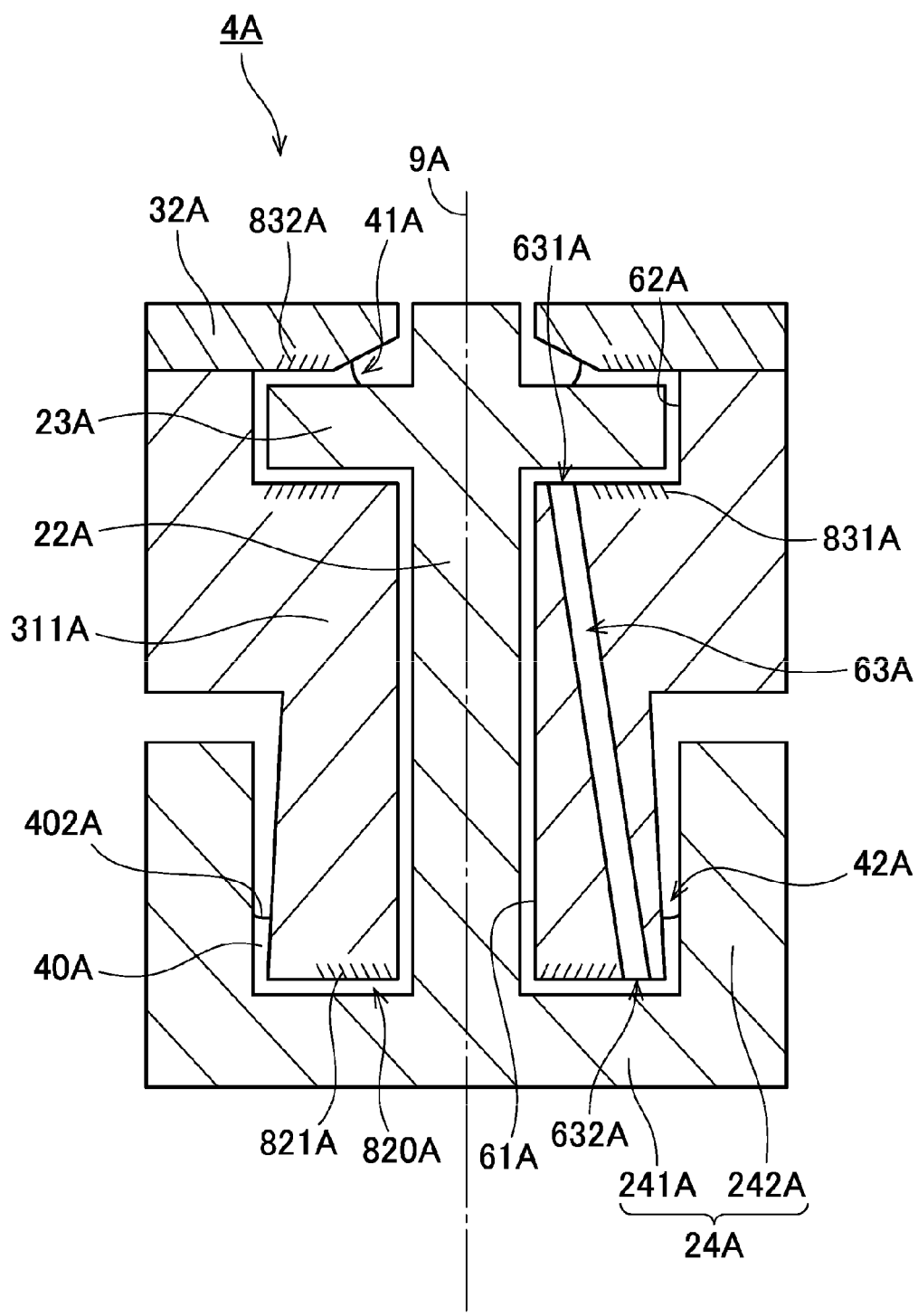
FIG. 1 is a vertical cross-sectional view of a bearing apparatus according to a first preferred embodiment of the present invention.

FIG. 1 is a vertical cross-sectional view of a bearing apparatus 4A according to a first preferred embodiment of the present invention. Referring to FIG. 1, the bearing apparatus 4A preferably includes a stationary shaft 22A, an upper annular portion 23A, a lower annular portion 24A, a sleeve 311A, a cap 32A, and a lubricating oil 40A. The lubricating oil 40A is preferably arranged between a combination of the stationary shaft 22A, the upper annular portion 23A, and the lower annular portion 24A and a combination of the sleeve 311A and the cap 32A.

The stationary shaft 22A is arranged to extend along a central axis 9A extending in the vertical direction. The upper annular portion 23A is arranged to project radially outward from the stationary shaft 22A to assume a cylindrical or substantially cylindrical shape. The lower annular portion 24A is arranged to project radially outward from the stationary shaft 22A to assume or substantially assume the shape of a circular ring below the upper annular portion 23A. The lower annular portion 24A preferably includes a bottom plate portion 241A and a wall portion 242A. The bottom plate portion 241A is arranged to extend in or substantially in the shape of a disk below the sleeve 311A. The wall portion 242A is arranged to extend upward from the bottom plate portion 241A to assume a cylindrical or substantially cylindrical shape radially outside of the sleeve 311A.

The sleeve 311A is arranged between the upper and lower annular portions 23A and 24A. The sleeve 311A is supported to be rotatable about the central axis 9A. The sleeve 311A preferably includes a communicating hole 63A. The communicating hole 63A is arranged to connect an upper opening 631A defined in an upper surface of the sleeve 311A and a lower opening 632A defined below the upper opening 631A with each other. The cap 32A is arranged above the upper annular portion 23. The cap 32A is arranged to rotate together with the sleeve 311A.

The upper surface of the sleeve 311A and a lower surface of the upper annular portion 23A are arranged axially opposite to each other. A lower surface of the sleeve 311A and an upper surface of the bottom plate portion 241A are arranged axially opposite to each other. An outer circumferential surface of the sleeve 311A and an inner circumferential surface of the wall portion 242A are arranged radially opposite to each other. The sleeve 311A preferably includes a first inner circumferential surface 61A and a second inner circumferential surface 62A. The first inner circumferential surface 61A is arranged radially opposite to an outer circumferential surface of the stationary shaft 22A. The second inner circumferential surface 62A is arranged radially outside of the upper annular portion 23A.

An upper surface of the upper annular portion 23A and a lower surface of the cap 32A are arranged to together define an upper capillary seal portion 41A. At the upper capillary seal portion 41A, the axial distance between the upper surface of the upper annular portion 23A and the lower surface of the cap 32A is arranged to gradually increase with decreasing distance from the central axis 9A.

The outer circumferential surface of the sleeve 311A and the inner circumferential surface of the wall portion 242A are arranged to together define a lower capillary seal portion 42A therebetween. At the lower capillary seal portion 42A, the radial distance between the outer circumferential surface of the sleeve 311A and the inner circumferential surface of the wall portion 242A is arranged to gradually increase with increasing height. A lower surface 402A of the lubricating oil 40A is defined in the lower capillary seal portion 42A.

A thrust dynamic pressure bearing portion 820A is preferably defined between the lower surface of the sleeve 311A and the upper surface of the bottom plate portion 241A. At least one of the lower surface of the sleeve 311A and the upper surface of the bottom plate portion 241A, which are arranged to together define the thrust dynamic pressure bearing portion 820A, preferably includes a thrust dynamic pressure groove array 821A defined therein. The thrust dynamic pressure groove array 821A is arranged to draw a portion of the lubricating oil 40A which is present between the sleeve 311A and the bottom plate portion 241A radially inward during rotation of the sleeve 311A.

The lower opening 632A of the sleeve 311A is arranged radially outward of an inner circumferential portion of the thrust dynamic pressure bearing portion 820A. In addition, a radially outer edge of the lower opening 632A is arranged at a radial position overlapping with an outer circumferential portion of the thrust dynamic pressure bearing portion 820A, or radially outward of the outer circumferential portion of the thrust dynamic pressure bearing portion 820A.

One of the upper surface of the sleeve 311A and the lower surface of the upper annular portion 23A includes a first pumping groove array 831A defined therein. The first pumping groove array 831A is arranged to send a portion of the lubricating oil 40A which is present between the sleeve 311A and the upper annular portion 23A radially inward during the rotation of the sleeve 311A. The upper opening 631A of the sleeve 311A is arranged radially inward of a radially outer end portion of the first pumping groove array 831A.

In addition, one of the lower surface of the cap 32A, the upper surface of the upper annular portion 23A, the second inner circumferential surface 62A, and an outer circumferential surface of the upper annular portion 23A preferably includes a second pumping groove array 841A arranged radially outward of the upper capillary seal portion 41A. In the case where the second pumping groove array 841A is defined in one of the lower surface of the cap 32A and the upper surface of the upper annular portion 23A, a portion of the lubricating oil 40A which is present near the second pumping groove array 841A is sent radially outward once a spindle motor is started. In the case where the second pumping groove array 841A is defined in one of the second inner circumferential surface 62A and the outer circumferential surface of the upper annular portion 23A, a portion of the lubricating oil 40A which is present near the second pumping groove array 841A is sent axially downward once the spindle motor is started.

Both the axial distance between the first pumping groove array 831A and a surface opposed thereto and the distance between the second pumping groove array 841A and a surface opposed thereto are preferably longer than the axial dimension of the thrust dynamic pressure bearing portion 820A.

As described above, two pumping groove arrays, i.e., the first and second pumping groove arrays 831A and 841A, are provided at different locations in the bearing apparatus 4A. The first and second pumping groove arrays 831A and 841A are preferably not defined in a single continuous flat surface. This makes it possible to reduce the distance between each pumping groove array and the central axis 9A while securing sufficient effects of pumping seals, and also to reduce the radial dimension of the upper annular portion 23A. This in turn leads to a reduction in a loss of a torque.

Figure 2:
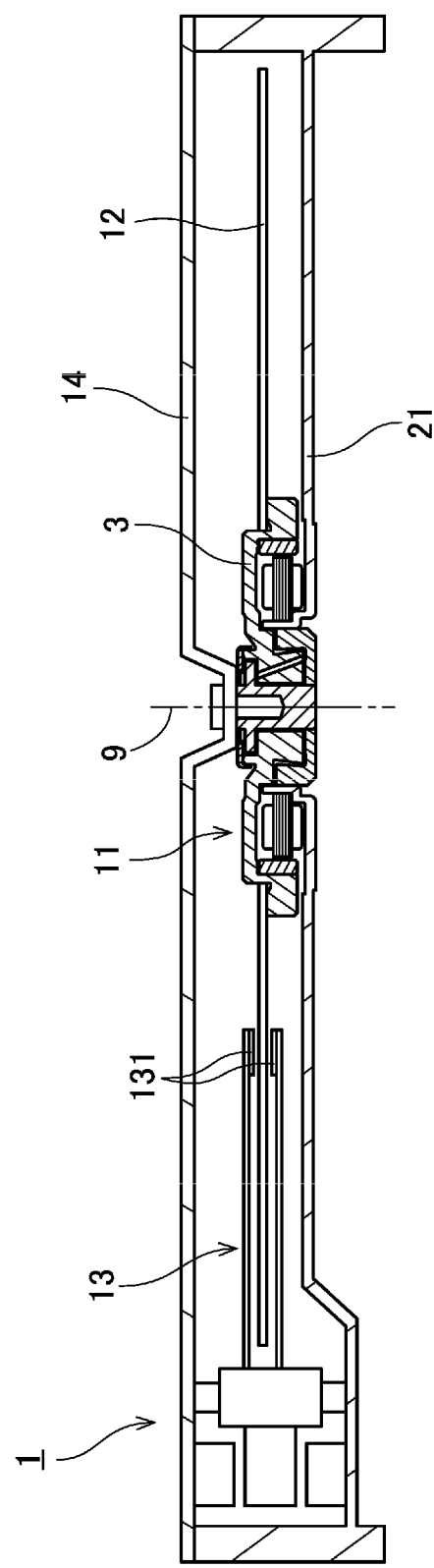
FIG. 2 is a vertical cross-sectional view of a disk drive apparatus according to a second preferred embodiment of the present invention.

FIG. 2 is a vertical cross-sectional view of a disk drive apparatus 1 according to a second preferred embodiment of the present invention. The disk drive apparatus 1 is arranged to rotate a magnetic disk 12 and perform reading and writing of information from or to the magnetic disk 12. As illustrated in FIG. 2, the disk drive apparatus 1 preferably includes a spindle motor 11, the magnetic disk 12, an access portion 13, and a cover 14.

The spindle motor 11 is arranged to rotate the magnetic disk 12 about a central axis 9 while supporting the magnetic disk 12. The spindle motor 11 includes a base portion 21 arranged to extend in directions perpendicular to the central axis 9. An upper portion of the base portion 21 is covered with the cover 14. A rotating portion 3 of the spindle motor 11, the magnetic disk 12, and the access portion 13 are preferably accommodated inside a housing defined by the base portion 21 and the cover 14. The access portion 13 is arranged to move heads 131 along a recording surface of the magnetic disk 12 to perform the reading and writing of information from or to the magnetic disk 12.

Note that the number of magnetic disks 12 included in the disk drive apparatus 1 may be more than one if so desired. Also note that the access portion 13 may be arranged to perform only one of the reading and writing of information from or to the magnetic disk 12.

Figure 3:
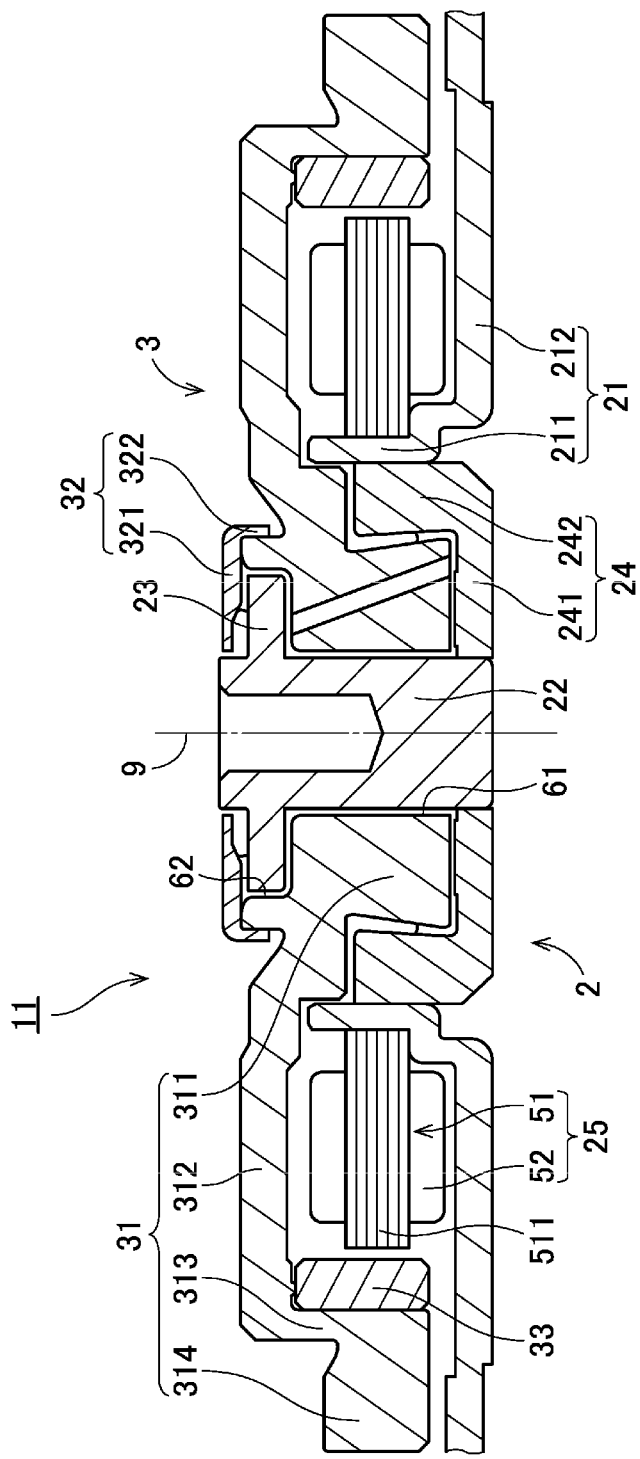
FIG. 3 is a vertical cross-sectional view of a spindle motor according to the second preferred embodiment of the present invention.

Next, the detailed structure of the spindle motor 11 will now be described below with reference to FIGS. 2 and 3. FIG. 3 is a vertical cross-sectional view of the spindle motor 11 according to a preferred embodiment of the present invention. As illustrated in FIG. 3, the spindle motor 11 includes a stationary portion 2 and the rotating portion 3. The stationary portion 2 is stationary with respect to the base portion 21 and the cover 14. The rotating portion 3 is supported to be rotatable with respect to the stationary portion 2.

The stationary portion 2 according to the present preferred embodiment preferably includes the base portion 21, a stationary shaft 22, an upper annular portion 23, a lower annular portion 24, and a stator 25.

The base portion 21 is arranged to extend in the directions perpendicular to the central axis 9 below the stator 25, the rotating portion 3, the magnetic disk 12, and the access portion 13. The base portion 21 is preferably made of, for example, a metal such as aluminum, an aluminum alloy, etc. As illustrated in FIG. 3, the base portion 21 preferably includes a cylindrical holder portion 211 and a plate portion 212. The cylindrical holder portion 211 is arranged to extend in the axial direction to assume a cylindrical or substantially cylindrical shape radially inside the stator 25. The plate portion 212 is arranged to extend radially outward from a lower end portion of the cylindrical holder portion 211.

The stationary shaft 22 is arranged to extend along the central axis 9. The stationary shaft 22 is preferably made of, for example, a metal such as stainless steel. As illustrated in FIG. 2, an upper end of the stationary shaft 22 is fixed to the cover 14 of the disk drive apparatus 1. Meanwhile, a lower end portion of the stationary shaft 22 is fixed to the cylindrical holder portion 211 of the base portion 21 through the lower annular portion 24.

The upper annular portion 23 is an annular portion arranged between a cap 32 and a sleeve 311, which will be described below. The upper annular portion 23 is arranged to project radially outward from a portion of an outer circumferential surface of the stationary shaft 22 near the upper end of the stationary shaft 22. In the present preferred embodiment, the stationary shaft 22 and the upper annular portion 23 are preferably defined by a single continuous monolithic member. Note that the stationary shaft 22 and the upper annular portion 23 may alternatively be defined by separate members if so desired.

The lower annular portion 24 is a member that preferably has a circular or substantially circular ring shape and is arranged below the upper annular portion 23. The lower annular portion 23 defines a portion projecting radially outward from the lower end portion of the stationary shaft 22. In the present preferred embodiment, the lower annular portion 24 is separate from the stationary shaft 22, and is fixed to the lower end portion of the stationary shaft 22. Note that the stationary shaft 22 and the lower annular portion 24 may be defined by a single continuous member.

The lower annular portion 24 according to the present preferred embodiment preferably includes a bottom plate portion 241 and a wall portion 242. The bottom plate portion 241 is arranged to extend below the sleeve 311, which will be described below, to assume or substantially assume the shape of a disk. An inner circumferential surface of the bottom plate portion 241 is fixed to the outer circumferential surface of the stationary shaft 22 preferably through, for example, press fitting, shrink fitting, an adhesive, or any other desirable fixing method. The wall portion 242 is preferably arranged to extend upward from a radially outer edge portion of the bottom plate portion 241 to assume a cylindrical or substantially cylindrical shape. The wall portion 242 is arranged radially outside of the sleeve 311, which will be described below. In addition, the wall portion 242 is fixed to an inner circumferential surface of the cylindrical holder portion 211. The lower annular portion 24 is arranged to assume or substantially assume the shape of the letter "L" in a vertical section with the bottom plate portion 241 and the wall portion 242.

The stator 25 preferably includes a stator core 51 and a plurality of coils 52. The stator core 51 is preferably defined by, for example, laminated steel sheets, that is, by electromagnetic steel sheets, such as silicon steel sheets, placed one upon another in the axial direction. The stator core is fixed to an outer circumferential surface of the cylindrical holder portion 211. In addition, the stator core 51 includes a plurality of teeth 511 arranged to project radially outward. Each of the coils 52 is defined by a conducting wire wound around a separate one of the teeth 511.

The rotating portion 3 preferably includes a hub 31, the cap 32, and a magnet 33.

The hub 31 is supported to be rotatable about the central axis 9 around the stationary shaft 22. The hub 31 is preferably made of, for example, a metal such as stainless steel. The hub 31 according to the present preferred embodiment preferably includes the sleeve 311, a top plate portion 312, an outer cylindrical portion 313, and a flange portion 314. The sleeve 311 is arranged to extend in the axial direction to assume a cylindrical or substantially cylindrical shape around the stationary shaft 22. The top plate portion 312 is arranged to extend radially outward from an upper end portion of the sleeve 311. The outer cylindrical portion 313 is arranged to extend downward from a radially outer edge portion of the top plate portion 312 to assume a cylindrical or substantially cylindrical shape. The flange portion 314 is arranged to project radially outward from a lower end portion of the outer cylindrical portion 313.

The sleeve 311 is arranged axially between the upper annular portion 23 and the bottom plate portion 241 of the lower annular portion 24. An upper surface of the sleeve 311 and a lower surface of the upper annular portion 23 are arranged axially opposite to each other. A lower surface of the sleeve 311 and an upper surface of the bottom plate portion 241 are arranged axially opposite to each other. An outer circumferential surface of the sleeve 311 and an inner circumferential surface of the wall portion 242 are arranged radially opposite to each other. The sleeve 311 preferably includes a first inner circumferential surface 61 and a second inner circumferential surface 62. The first inner circumferential surface 61 is arranged radially opposite to the outer circumferential surface of the stationary shaft 22. The second inner circumferential surface 62 is arranged above the first inner circumferential surface 61 and radially outside of the upper annular portion 23.

A lower surface of the magnetic disk 12 is arranged to be in contact with at least a portion of an upper surface of the flange portion 314. Thus, the magnetic disk 12 is axially positioned. In addition, an inner circumferential portion of the magnetic disk 12 is arranged to be in contact with at least a portion of an outer circumferential surface of the outer cylindrical portion 313. Thus, the magnetic disk 12 is radially positioned. As described above, in the present preferred embodiment, the outer cylindrical portion 313 and the flange portion 314 are arranged to together define a support portion to support the magnetic disk 12.

The cap 32 is preferably in or substantially in the shape of a disk including a circular hole at a center thereof. The cap 32 may preferably be made of either a metal or a resin, for example. The cap 32 according to the present preferred embodiment preferably includes a cap plate portion 321 and a cap projecting portion 322. The cap plate portion 321 is arranged to extend in an annular or substantially annular shape above the sleeve 311 and the upper annular portion 23. In addition, an inner circumferential portion of the cap plate portion 321 is arranged radially opposite to the outer circumferential surface of the stationary shaft 22 with a slight gap intervening therebetween. The cap projecting portion 322 is arranged to project downward from a radially outer end portion of the cap plate portion 321 to assume a cylindrical or substantially cylindrical shape. An inner circumferential surface of the cap projecting portion 322 preferably is fixed to the hub 31 through, for example, an adhesive. The cap 32 is arranged to rotate together with the hub 31 during rotation of the hub 31.

The magnet 33 is arranged radially outside of the stator 25, and is fixed to an inner circumferential surface of the outer cylindrical portion 313. The magnet 33 according to the present preferred embodiment is defined in the shape of a circular or substantially circular ring. An inner circumferential surface of the magnet 33 is arranged radially opposite to a radially outer end surface of each of the teeth 511. In addition, the inner circumferential surface of the magnet 33 includes north and south poles arranged to alternate with each other in a circumferential direction.

Note that a plurality of magnets may be used in place of the magnet 33 in the shape of a circular or substantially circular ring. In the case where the plurality of magnets are used, the magnets are arranged such that north and south poles alternate with each other in the circumferential direction.

Once electric drive currents are supplied to the coils in the spindle motor 11 described above, magnetic flux is generated around each of the teeth 511. Then, interaction between the magnetic flux of the teeth 511 and that of the magnet 33 produces a circumferential torque between the stationary portion 2 and the rotating portion 3, so that the rotating portion 3 is caused to rotate about the central axis 9 with respect to the stationary portion 2. The magnetic disk 12 supported by the hub 31 is caused to rotate about the central axis 9 together with the rotating portion 3.

Figure 4:
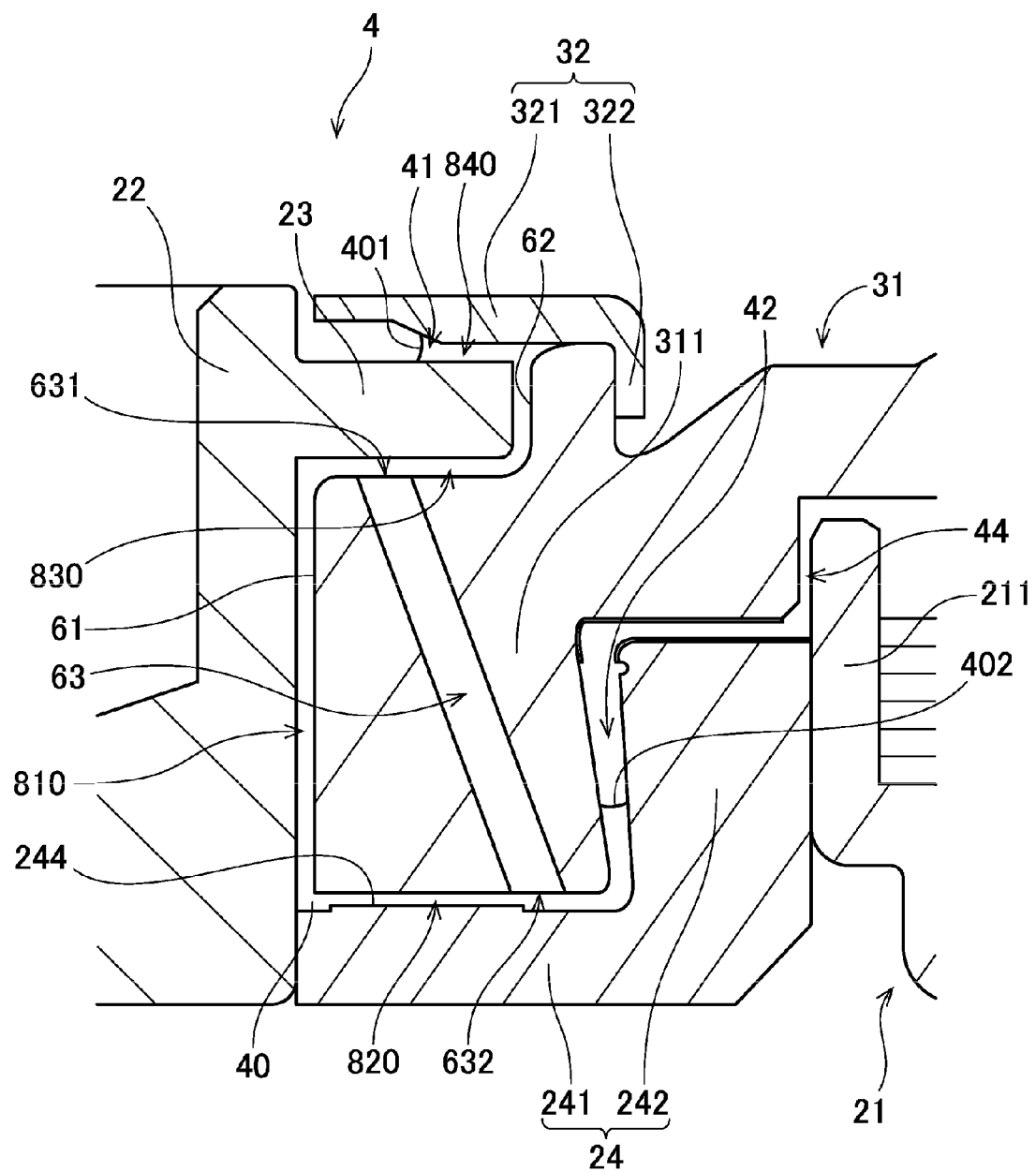
FIG. 4 is a partial vertical cross-sectional view of the spindle motor according to the second preferred embodiment of the present invention.

Next, the structure of a fluid dynamic bearing apparatus 4 included in the spindle motor 11 in accordance with a preferred embodiment of the present invention will now be described below. FIG. 4 is a partial vertical cross-sectional view of the spindle motor 11, illustrating the fluid dynamic bearing apparatus 4 and its vicinity. As illustrated in FIG. 4, a lubricating oil 40 is arranged between a combination of the stationary shaft 22, the upper annular portion 23, and the lower annular portion 24 and a combination of the sleeve 311 and the cap 32. The lubricating oil 40 preferably includes an upper surface 401, i.e., an upper liquid surface, and a lower surface 402, i.e., a lower liquid surface. An polyolester oil or a diester oil, for example, is preferably used as the lubricating oil 40. The sleeve 311 is supported through the lubricating oil such that the sleeve 311 is rotatable with respect to the stationary shaft 22, the upper annular portion 23, and the lower annular portion 24.

That is, the fluid dynamic bearing apparatus 4 according to the present preferred embodiment is preferably defined by the stationary shaft 22, the upper annular portion 23, the lower annular portion 24, the sleeve 311, the cap 32, and the lubricating oil 40, which is arranged between the combination of the sleeve 311 and the cap 32 and the combination of the stationary shaft 22, the upper annular portion 23, and the lower annular portion 24. The rotating portion 3 is supported through the lubricating oil 40 such that the rotating portion 3 is rotatable with respect to the stationary portion 2.

The sleeve 311 preferably includes a communicating hole 63. The communicating hole 63 is arranged to axially connect an upper opening 631 defined in the upper surface of the sleeve 311 and a lower opening 632 defined in the lower surface of the sleeve 311 with each other. An inside of the communicating hole 63 is also filled with the lubricating oil 40.

Figure 5:
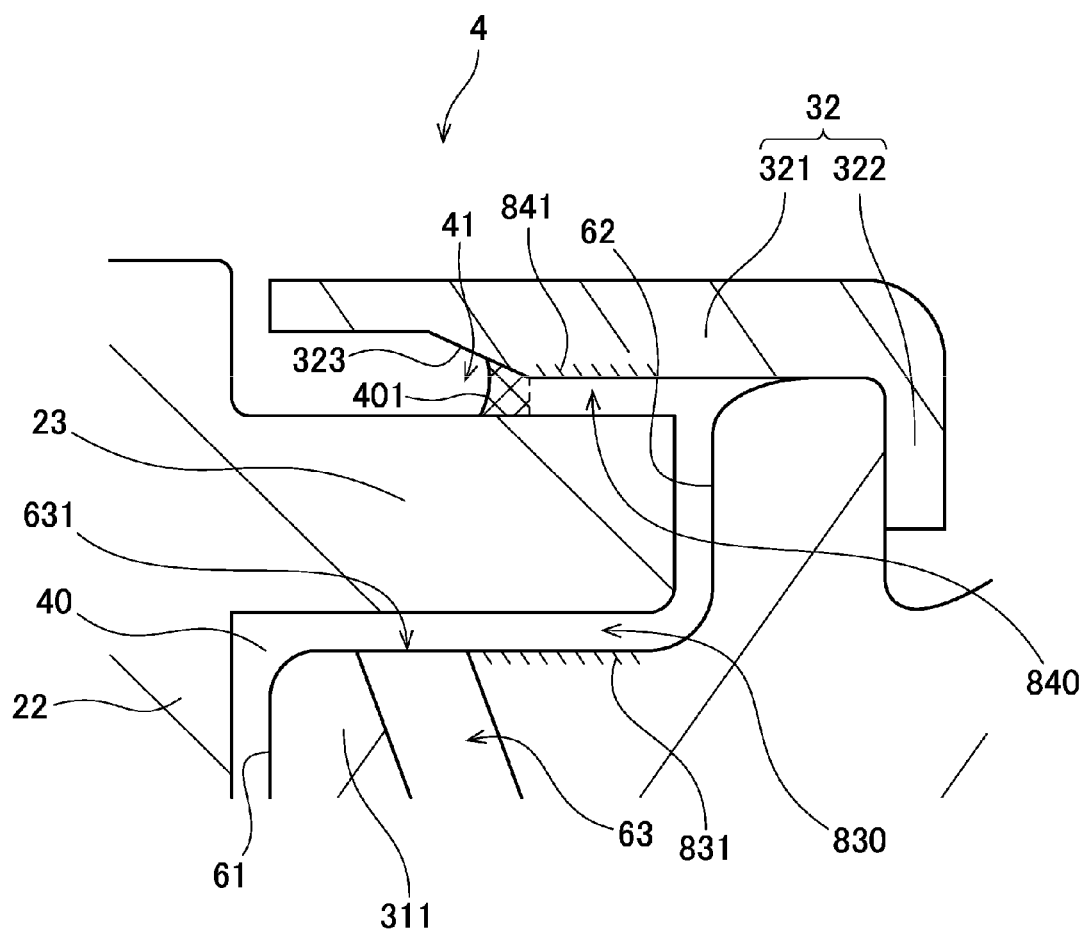
FIG. 5 is a partial vertical cross-sectional view of a fluid dynamic bearing apparatus according to the second preferred embodiment of the present invention.

FIG. 5 is a partial vertical cross-sectional view of the fluid dynamic bearing apparatus 4, illustrating the upper surface 401 of the lubricating oil 40 and its vicinity. As illustrated in FIG. 5, a lower surface of the cap plate portion 321 of the cap 32 preferably includes a first tapered surface 323. The first tapered surface 323 is arranged to gradually increase in height with decreasing distance from the central axis 9. An upper surface of the upper annular portion 23 and the first tapered surface 323 are arranged to together define an upper capillary seal portion 41. At the upper capillary seal portion 41, the axial distance between the upper surface of the upper annular portion 23 and the first tapered surface 323 is arranged to gradually increase with decreasing distance from the central axis 9.

When the sleeve 311 is in a stationary state, the upper surface 401 of the lubricating oil 40 is defined in the upper capillary seal portion 41 as illustrated in FIG. 5. The upper surface 401 of the lubricating oil 40 defines a meniscus in the upper capillary seal portion 41.

Figure 6:
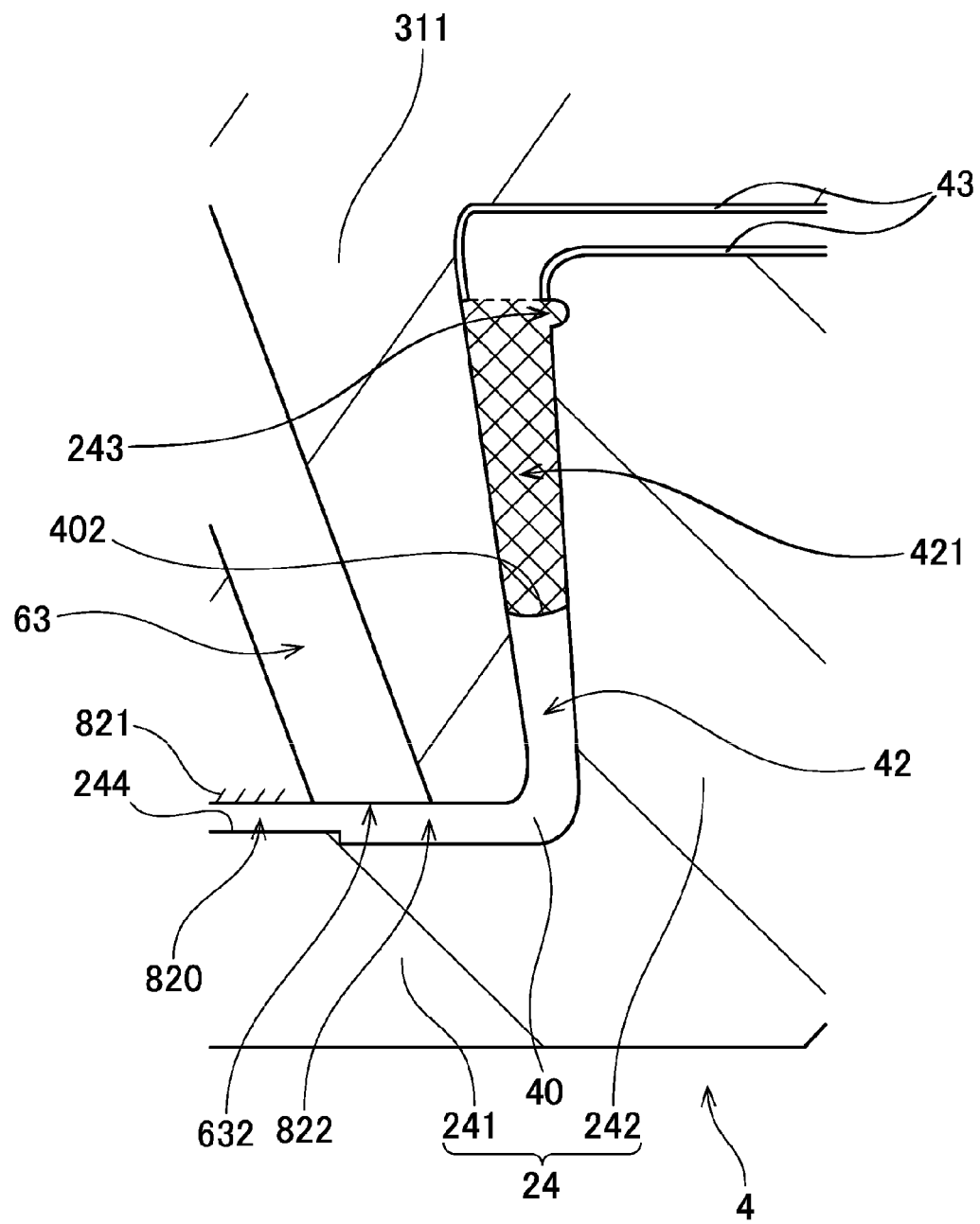
FIG. 6 is a partial vertical cross-sectional view of the fluid dynamic bearing apparatus according to the second preferred embodiment of the present invention.

FIG. 6 is a partial vertical cross-sectional view of the fluid dynamic bearing apparatus 4, illustrating the lower surface 402 of the lubricating oil 40 and its vicinity. As illustrated in FIG. 6, the outer circumferential surface of the sleeve 311 and the inner circumferential surface of the wall portion 242 are arranged to together define a lower capillary seal portion 42 therebetween. At the lower capillary seal portion 42, the radial distance between the outer circumferential surface of the sleeve 311 and the inner circumferential surface of the wall portion 242 is arranged to gradually increase with increasing height. The lower surface 402 of the lubricating oil 40 is defined in the lower capillary seal portion 42. The lower surface 402 of the lubricating oil 40 defines a meniscus in the lower capillary seal portion 42.

The lower capillary seal portion 42 preferably includes a margin portion 421 indicated by cross-hatching in FIG. 6. In the present preferred embodiment, the margin portion 421 is arranged above the lower surface 402 of the lubricating oil 40 and below lower end portions of oil-repellent films 43, which will be described below. The volume of a portion of the lubricating oil 40 which is held in the upper capillary seal portion 41 when the sleeve 311 is in the stationary state (i.e., a portion of the lubricating oil 40 which is indicated by cross-hatching in FIG. 5) is preferably smaller than the capacity of the margin portion 421. Once the sleeve 311 starts rotating, the upper surface 401 of the lubricating oil 40 is drawn inward by action of a first pumping seal portion 830 and a second pumping seal portion 840 (see FIG. 5), which will be described below. As a result, the position of the lower surface 402 of the lubricating oil 40 rises. The risen lower surface 402 comes into the margin portion 421 and is held therein.

In addition, as illustrated in FIG. 6, in the present preferred embodiment, a portion of a surface of the sleeve 311 and a portion of a surface of the wall portion 242 are covered with the oil-repellent films 43. The lower end portion of each oil-repellent film 43 is arranged above the lower surface 402 of the lubricating oil 40. If the lower surface 402 of the lubricating oil 40 rises up to a level of the lower end portion of either oil-repellent film 43, the lower surface 402 of the lubricating oil 40 will be repelled by the oil-repellent film 43. This arrangement reduces the likelihood that the lubricating oil 40 will leak above the lower end portion of either oil-repellent film 43.

Moreover, in the present preferred embodiment, the inner circumferential surface of the wall portion 242 preferably includes an annular groove 243 defined therein. The annular groove 243 is arranged above the lower surface 402 of the lubricating oil 40 when the sleeve 311 is in the stationary state. Each oil-repellent film 43 is arranged above the annular groove 243. When the spindle motor 11 is manufactured, an oil-repellent agent which is to become the oil-repellent film 43 after being solidified may drip downward. However, a portion of the oil-repellent agent which drips downward will be held in the annular groove 243. This reduces the likelihood that the oil-repellent agent will drip below the annular groove 243.

Furthermore, as illustrated in FIG. 4, the spindle motor 11 preferably includes a labyrinth seal portion 44 arranged radially outward of the lower capillary seal portion 42. In the present preferred embodiment, the labyrinth seal portion 44 is defined between the cylindrical holder portion 211 and the hub 31. The radial distance between the cylindrical holder portion 211 and the hub 31 at the labyrinth seal portion 44 is preferably shorter than the radial distance between the wall portion 242 and the sleeve 311 at the lower capillary seal portion 42. This arrangement contributes to reducing an entrance and exit of gas through the labyrinth seal portion 44. This contributes to reducing evaporation of the lubricating oil 40 through the lower surface 402.

Figure 7:
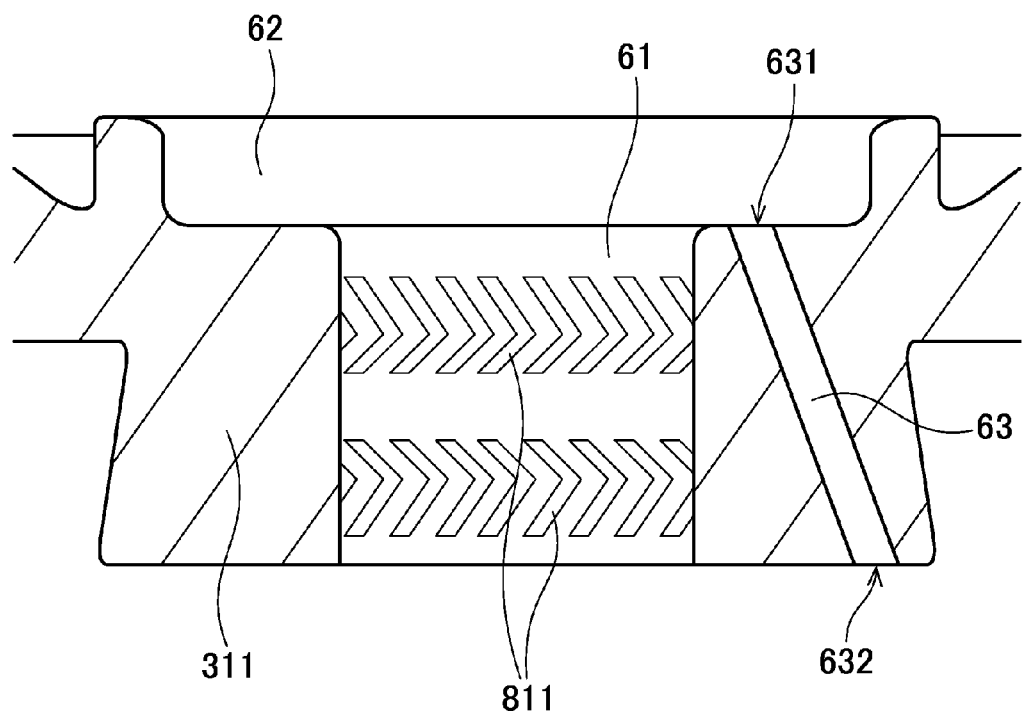
FIG. 7 is a vertical cross-sectional view of a sleeve according to the second preferred embodiment of the present invention.

FIG. 7 is a vertical cross-sectional view of the sleeve 311 according to a preferred embodiment of the present invention. A radial dynamic pressure bearing portion 810 will now be described below with reference to FIGS. 4 and 7. As illustrated in FIG. 7, the first inner circumferential surface 61 of the sleeve 311 preferably includes upper and lower radial dynamic pressure groove arrays 811 each of which is preferably arranged in a herringbone pattern, for example. During driving of the spindle motor 11, the sleeve 311 rotates in one direction with respect to the stationary shaft 22 and each radial dynamic pressure groove array 811 is arranged to draw in a portion of the lubricating oil 40 which is present between the stationary shaft 22 and the sleeve 311 toward a center of the radial dynamic pressure groove array 811. This arrangement enables the sleeve 311 to be supported radially with respect to the stationary shaft 22.

That is, in the present preferred embodiment, the radial dynamic pressure bearing portion 810, which is arranged to produce a radial supporting force, is defined between the outer circumferential surface of the stationary shaft 22, which is a bearing surface in the stationary portion 2, and the first inner circumferential surface 61 of the sleeve 311, which is a bearing surface in the rotating portion 3. Note that it is enough that the radial dynamic pressure groove arrays 811 be defined in at least one of the outer circumferential surface of the stationary shaft 22 and the first inner circumferential surface 61 of the sleeve 311 which are arranged to together define the radial dynamic pressure bearing portion 810.

Figure 8:
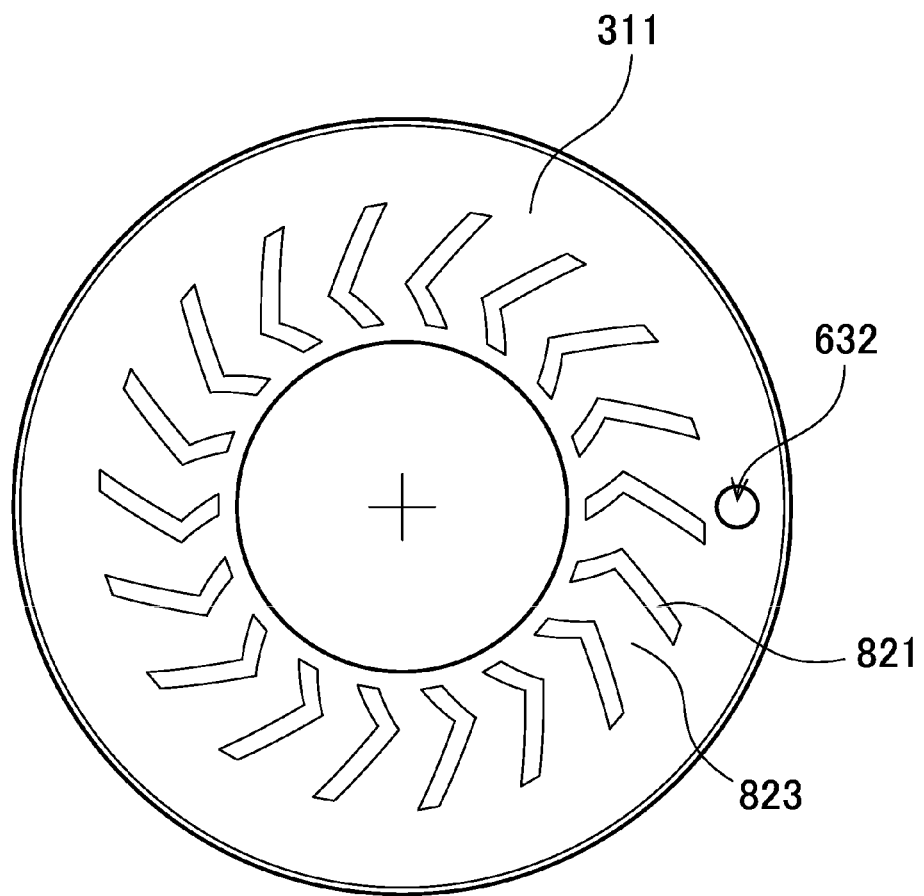
FIG. 8 is a bottom view of the sleeve according to the second preferred embodiment of the present invention.

FIG. 8 is a bottom view of the sleeve 311 in accordance with a preferred embodiment of the present invention. As illustrated in FIGS. 6 and 8, the lower surface of the sleeve 311 preferably includes a thrust dynamic pressure groove array 821 arranged in a herringbone pattern. During the driving of the spindle motor 11, the sleeve 311 rotates in one direction with respect to the lower annular portion 24 and the thrust dynamic pressure groove array 821 is arranged to draw a portion of the lubricating oil 40 which is present between the bottom plate portion 241 and the sleeve 311 radially inward. This arrangement enables the sleeve 311 to be supported axially with respect to the lower annular portion 24.

As illustrated in FIGS. 4 and 6, the upper surface of the bottom plate portion 241 preferably includes a thrust bearing surface 244 arranged to project slightly upward. The thrust dynamic pressure groove array 821 is preferably defined in a portion of the lower surface of the sleeve 311 which is opposite to the thrust bearing surface 244. That is, in the present preferred embodiment, a thrust dynamic pressure bearing portion 820, which is arranged to produce an axial supporting force, is defined between the thrust bearing surface 244, which is a bearing surface in the stationary portion 2, and the lower surface of the sleeve 311, which is a bearing surface in the rotating portion 3.

When the spindle motor 11 is in the stationary state, the thrust bearing surface 244 and the lower surface of the sleeve 311 are in contact with each other. Once the spindle motor 11 is started, a dynamic pressure produced by the thrust dynamic pressure bearing portion 820 causes the thrust bearing surface 244 and the lower surface of the sleeve 311 to be separated from each other in the axial direction. However, the axial distance between the thrust bearing surface 244 and the lower surface of the sleeve 311 is preferably shorter than the axial distance between the lower surface of the upper annular portion 23 and the upper surface of the sleeve 311 even when the spindle motor 11 is started or is running at a rated speed. That is, both the axial distance between a first pumping groove array 831, which will be described below, and a surface opposed thereto and the distance between a second pumping groove array 841, which will be described below, and a surface opposed thereto are longer than the axial dimension of the thrust dynamic pressure bearing portion 820. A short axial distance between the thrust bearing surface 244 and the lower surface of the sleeve 311 leads to an increase in the axial supporting force produced by the thrust dynamic pressure bearing portion 820.

Note that it is enough that the thrust dynamic pressure groove array 821 should be defined in at least one of the thrust bearing surface 244 and the lower surface of the sleeve 311 which are arranged to together define the thrust dynamic pressure bearing portion 820. Also note that the thrust dynamic pressure groove array 821 may be arranged to extend radially outward beyond the thrust bearing surface 244. Also note that the upper surface of the bottom plate portion 241 may be arranged to be flat and flush with the lower surface of the sleeve 311 including a thrust bearing surface arranged to project slightly downward. Also note that the thrust dynamic pressure groove array 821 may be a groove array arranged in a spiral pattern to draw the lubricating oil 40 radially inward during rotation of the sleeve 311.

Moreover, referring to FIG. 6, in the present preferred embodiment, a gap between the lower surface of the sleeve 311 and the upper surface of the bottom plate portion 241 preferably includes a wide gap portion 822 arranged radially outward of the thrust dynamic pressure bearing portion 820. The axial distance between the sleeve 311 and the bottom plate portion 241 is longer at the wide gap portion 822 than at the thrust dynamic pressure bearing portion 820.

Referring to FIG. 8, in the present preferred embodiment, the lower opening 632 of the communicating hole 63 is preferably arranged radially outward of the thrust dynamic pressure groove array 821. The lower opening 632 is preferably arranged at least radially outward of an inner circumferential portion of the thrust dynamic pressure bearing portion 820. In addition, a radially outer edge of the lower opening 632 is preferably arranged at a radial position overlapping with an outer circumferential portion of the thrust dynamic pressure bearing portion 820, or radially outward of the outer circumferential portion of the thrust dynamic pressure bearing portion 820.

Referring to FIG. 6, in the present preferred embodiment, the lower opening 632 of the communicating hole 63 is arranged to be open toward the wide gap portion 822. This reduces the likelihood that, if an air bubble is generated in the lubricating oil 40 because of the first pumping groove array 831, which will be described below, the air bubble will enter into the thrust dynamic pressure bearing portion 820 such that the air bubble will pass through the communicating hole 63 and the wide gap portion 822 to the lower capillary seal portion 42, and be discharged to an outside through the lower surface 402 of the lubricating oil 40.

Figure 9:
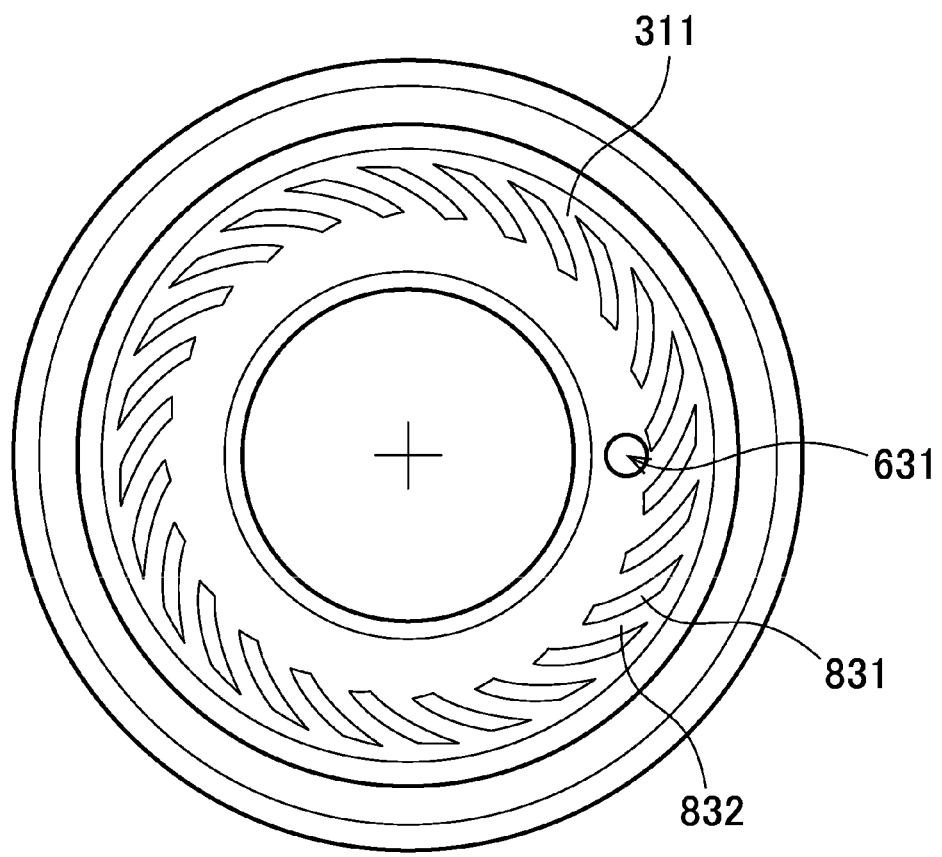
FIG. 9 is a top view of the sleeve according to the second preferred embodiment of the present invention.

FIG. 9 is a top view of the sleeve 311 according to a preferred embodiment of the present invention. As illustrated in FIGS. 5 and 9, the upper surface of the sleeve 311 preferably includes the first pumping groove array 831, which is preferably arranged in a spiral pattern. The upper opening 631 of the communicating hole 63 is arranged radially inward of the first pumping groove array 831. The upper opening 631 is preferably arranged at least radially inward of a radially outer end portion of the first pumping groove array 831.

Figure 10:
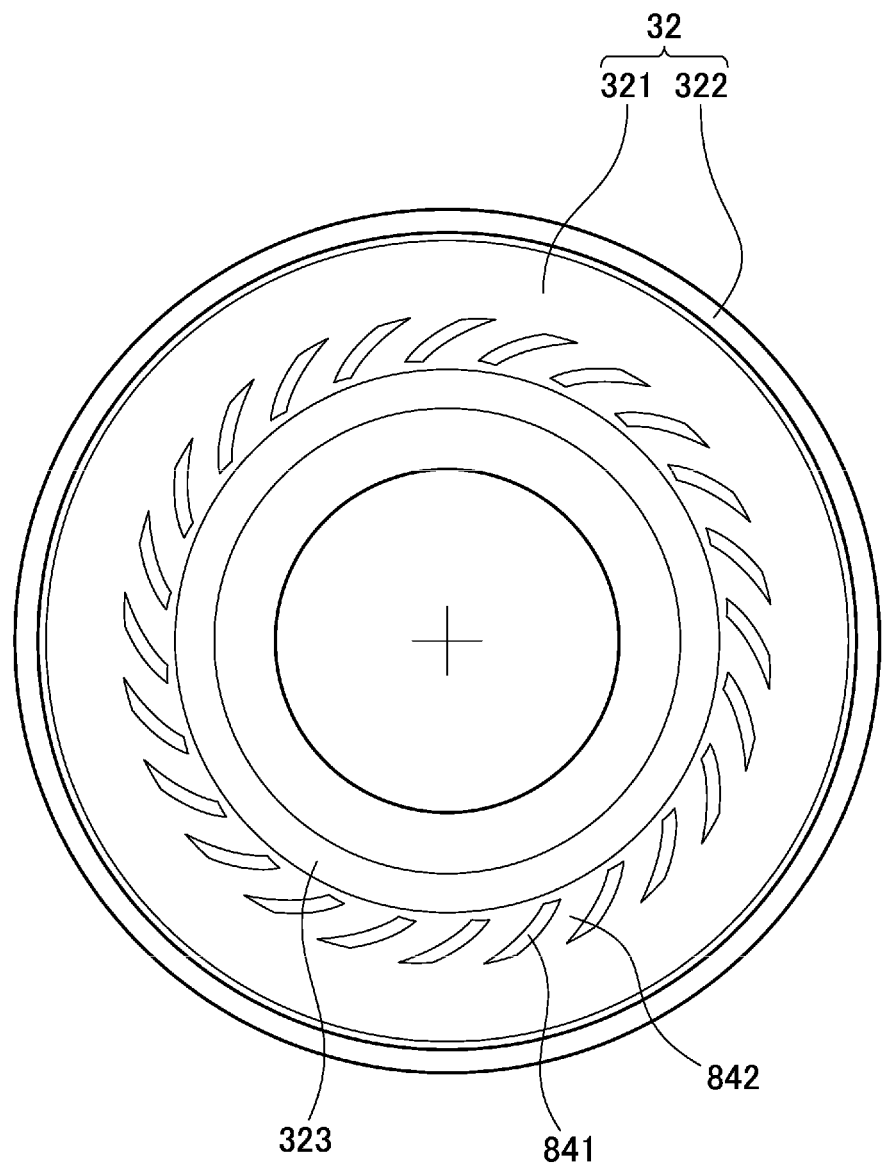
FIG. 10 is a bottom view of a cap according to the second preferred embodiment of the present invention.

FIG. 10 is a bottom view of the cap 32 according to a preferred embodiment of the present invention. As illustrated in FIGS. 5 and 10, the lower surface of the cap plate portion 321 preferably includes the second pumping groove array 841, which is arranged in a spiral pattern. The second pumping groove array 841 is arranged radially outward of the first tapered surface 323, that is, radially outward of the upper capillary seal portion 41.

Once the spindle motor 11 is started, the sleeve 311 and the cap 32 rotate in one direction with respect to the upper annular portion 23 such that the first pumping groove array 831 is arranged to send a portion of the lubricating oil 40 which is present between the sleeve 311 and the upper annular portion 23 radially inward. In addition, the second pumping groove array 841 is arranged to send a portion of the lubricating oil 40 which is present between the upper annular portion 23 and the cap plate portion 321 radially outward at this time.

As a result, the upper surface 401 of the lubricating oil 40 moves inward toward an interior of the bearing apparatus. This reduces the likelihood that the lubricating oil 40 will leak out of the bearing apparatus through a gap between the upper annular portion 23 and the cap 32. That is, referring to FIG. 5, in the present preferred embodiment, the first pumping seal portion 830, which is arranged to send the lubricating oil 40 radially inward, is defined between the lower surface of the upper annular portion 23, which is a surface in the stationary portion 2, and the upper surface of the sleeve 311, which is a surface in the rotating portion 3. In addition, the second pumping seal portion 840, which is arranged to send the lubricating oil 40 radially outward, is defined between the upper surface of the upper annular portion 23, which is a surface in the stationary portion 2, and the lower surface of the cap plate portion 321, which is a surface in the rotating portion 3.

Note that it is enough that the first pumping groove array 831 should be defined in at least one of the lower surface of the upper annular portion 23 and the upper surface of the sleeve 311 which are arranged to together define the first pumping seal portion 830. Also note that it is enough that the second pumping groove array 841 should be defined in at least one of the upper surface of the upper annular portion 23 and the lower surface of the cap plate portion 321 which are arranged to together define the second pumping seal portion 840.

Also note that the first pumping groove array 831 may alternatively be a groove array arranged in a herringbone pattern as long as the first pumping groove array 831 as a whole is arranged to send the lubricating oil 40 radially inward. Also note that the second pumping groove array 841 may alternatively also be a groove array arranged in a herringbone pattern as long as the second pumping groove array 841 as a whole is arranged to send the lubricating oil 40 radially outward. However, in the case where a groove array arranged in a spiral pattern is adopted, each groove of the groove array is able to produce only one of a radially inward pressure and a radially outward pressure on the lubricating oil 40. This enables the lubricating oil 40 to be sent radially inward or radially outward more efficiently.

As described above, two pumping groove arrays which are arranged to act on the lubricating oil 40 in the vicinity of the upper surface 401 of the lubricating oil 40, i.e., the first and second pumping groove arrays 831 and 841, are preferably provided at different locations in the fluid dynamic bearing apparatus 4. The first and second pumping groove arrays 831 and 841 are preferably not defined in a single continuous flat surface. This arrangement makes it possible to reduce the distance between each pumping groove array and the central axis 9 while securing sufficient effects of pumping seals so as to reduce the radial dimension of the upper annular portion 23. This in turn leads to a reduction in a loss of torque between the upper annular portion 23 and the rotating portion 3.

Referring to FIG. 5, in the present preferred embodiment, in particular, the second pumping groove array 841 is preferably defined in one of the lower surface of the cap plate portion 321 and the upper surface of the upper annular portion 23, and a portion of the first pumping groove array 831 and a portion of the second pumping groove array 841 are arranged to axially overlap with each other. This makes it possible to reduce the distance between each pumping groove array and the central axis 9 while securing sufficient effects of the pumping seals.

Moreover, even if the upper annular portion 23 is displaced in the axial direction, the sum of the axial distance between the lower surface of the upper annular portion 23 and the upper surface of the sleeve 311 at the first pumping seal portion 830 and the axial distance between the upper surface of the upper annular portion 23 and the lower surface of the cap plate portion 321 at the second pumping seal portion 840 remains the same or substantially the same.

Referring to FIG. 9, in the present preferred embodiment, a first hill surface 832 is preferably arranged to extend between every adjacent pair of grooves of the first pumping groove array 831. Referring to FIG. 10, a second hill surface 842 is preferably arranged to extend between every adjacent pair of grooves of the second pumping groove array 841. Referring to FIG. 8, a third hill surface 823 is preferably arranged to extend between every adjacent pair of grooves of the thrust dynamic pressure groove array 821. Each first hill surface 832 is preferably arranged to have a circumferential width smaller than that of each third hill surface 823. In addition, each second hill surface 842 is also preferably arranged to have a circumferential width smaller than that of each third hill surface 823. This is because required functions of the first and second pumping groove arrays 831 and 841 are different from a required function of the thrust dynamic pressure groove array 821. Specifically, in the case of each of the first and second pumping groove arrays 831 and 841, the width of each groove of the pumping groove array and the width of each hill surface are preferably substantially equal to each other so that the pumping groove array can efficiently produce a dynamic pressure acting toward the interior of the bearing apparatus. In contrast, the width of each third hill surface 823 is preferably greater than the width of each groove of the thrust dynamic pressure groove array 821 in order to increase rigidity of the thrust dynamic pressure bearing portion 820. A damping effect tends to easily occur between each third hill surface 823 and the upper surface of the bottom plate portion 241 when the third hill surface 823 has a large width. This leads to an increase in the rigidity of the thrust dynamic pressure bearing portion 820.

Figure 11:
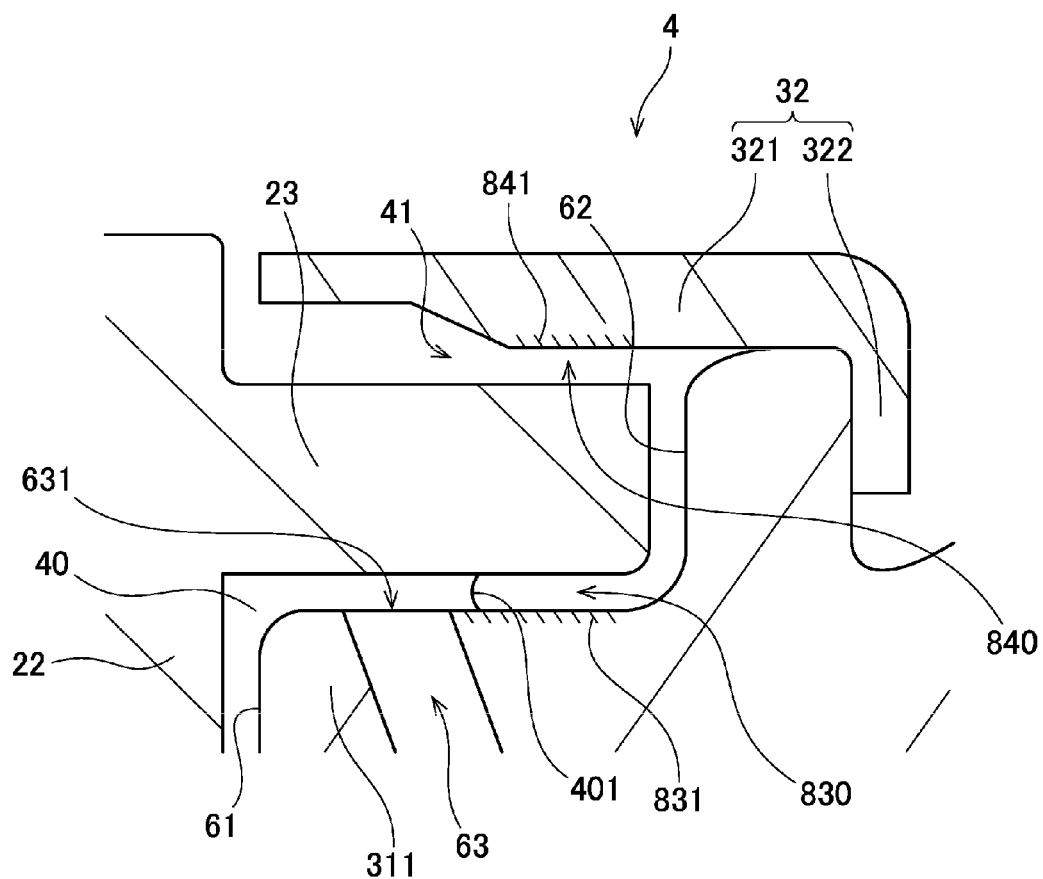
FIG. 11 is a partial vertical cross-sectional view of the fluid dynamic bearing apparatus according to the second preferred embodiment of the present invention.

FIG. 11 is a partial vertical cross-sectional view of the fluid dynamic bearing apparatus 4 according to a preferred embodiment of the present invention which illustrates the upper surface 401 of the lubricating oil 40 and its vicinity when the spindle motor 11 is running at the rated speed. Once the spindle motor 11 is started, each of the first and second pumping groove arrays 831 and 841 causes the upper surface 401 of the lubricating oil 40 to move inward toward the interior of the bearing apparatus. Then, when the spindle motor 11 is running at the rated speed, the upper surface 401 is located where a pulling pressure caused by the first pumping groove array 831 and a pressure in the interior of the bearing apparatus balance each other.

Referring to FIG. 11, in the present preferred embodiment, the upper surface 401 of the lubricating oil 40 is located in the first pumping seal portion 830 when the spindle motor 11 is running at the rated speed. Thus, the entire second pumping groove array 841 and at least a portion of the first pumping groove array 831 are exposed outside of the lubricating oil 40. This contributes to more effectively preventing the lubricating oil 40 from leaking out of the bearing apparatus through the upper capillary seal portion 41. The first pumping groove array 831 is arranged to keep producing a radially inward pressure on the portion of the lubricating oil 40 which is present between the upper annular portion 23 and the sleeve 311 even when the spindle motor 11 is running at the rated speed.

However, if the upper surface 401 of the lubricating oil 40 is drawn up to the upper opening 631 of the communicating hole 63, air may enter into the communicating hole 63. Therefore, the upper surface 401 of the lubricating oil 40 is preferably located radially outward of the upper opening 631 of the communicating hole 63 when the spindle motor 11 is running at the rated speed.

In addition, according to the present preferred embodiment, a difference between the volume of a portion of the lubricating oil 40 which is held in the upper capillary seal portion 41, the first pumping seal portion 830, and a gap extending between the upper capillary seal portion 41 and the first pumping seal portion 830 when the sleeve 311 is in the stationary state (i.e., the state illustrated in FIG. 5) and the volume of a portion of the lubricating oil 40 which is held in the first pumping seal portion 830 when the sleeve 311 is rotating at the rated speed (i.e., the state illustrated in FIG. 11) is preferably smaller than the capacity of the margin portion 421 of the lower capillary seal portion 42 illustrated in FIG. 6. Accordingly, if the action of the first and second pumping seal portions 830 and 840 causes the lower surface 402 of the lubricating oil 40 to rise, the lower surface 402 is preferably perfectly held in the margin portion 421. This contributes to more effectively preventing the lubricating oil 40 from leaking through the lower capillary seal portion 42.

While preferred embodiments of the present invention have been described above, it is to be understood that the present invention is not limited to the above-described preferred embodiments.

Figure 12:
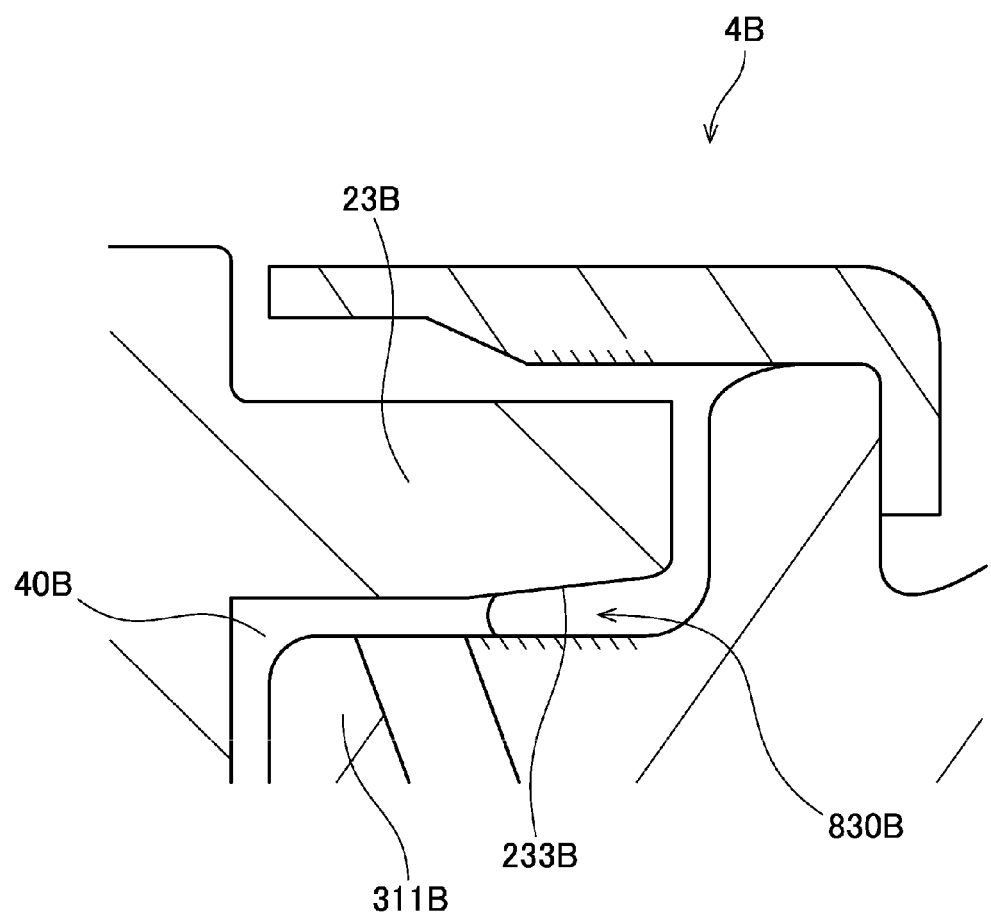
FIG. 12 is a partial vertical cross-sectional view of a fluid dynamic bearing apparatus according to a modification of the second preferred embodiment of the present invention.

FIG. 12 is a partial vertical cross-sectional view of a fluid dynamic bearing apparatus 4B according to a modification of the second preferred embodiment of the present invention. In the modification illustrated in FIG. 12, a lower surface of an upper annular portion 23B preferably includes a second tapered surface 233B arranged to gradually increase in height with decreasing distance from a radially outer end portion thereof. This causes the axial distance between an upper surface of a sleeve 311B and an outer portion of the lower surface of the upper annular portion 23B to gradually increase with increasing distance from the central axis. More specifically, the axial distance between the upper surface of the sleeve 311B and the second tapered surface 233B is caused to gradually increase with increasing distance from the central axis. This contributes to preventing contact between the upper annular portion 23B and the sleeve 311B in the vicinity of an outer circumferential portion of a first pumping seal portion 830B, and thus preventing contact between members exposed out of a lubricating oil 40B when the sleeve 311B is rotating at the rated speed.

Note that the lower surface of the upper annular portion 23B may include a shoulder. In this case, a portion of the lower surface of the upper annular portion 23B which is radially outward of the shoulder is arranged axially above a portion of the lower surface of the upper annular portion 23B which is radially inward of the shoulder. Also note that the lower surface of the upper annular portion 23B may include a plurality of shoulders.

Note that the lower surface of the upper annular portion 23B may alternatively be arranged to be a flat surface with the upper surface of the sleeve 311B including a tapered surface arranged to decrease in height with decreasing distance from a radially outer end portion thereof.

Also note that the lower surface of the upper annular portion 23B may alternatively be arranged to be a flat surface with the upper surface of the sleeve 311B including a shoulder. In this case, a portion of the upper surface of the sleeve 311B which is radially outward of the shoulder is arranged axially below a portion of the upper surface of the sleeve 311B which is radially inward of the shoulder. Also note that the upper surface of the sleeve 311B may include a plurality of shoulders, if so desired.

Figure 13:
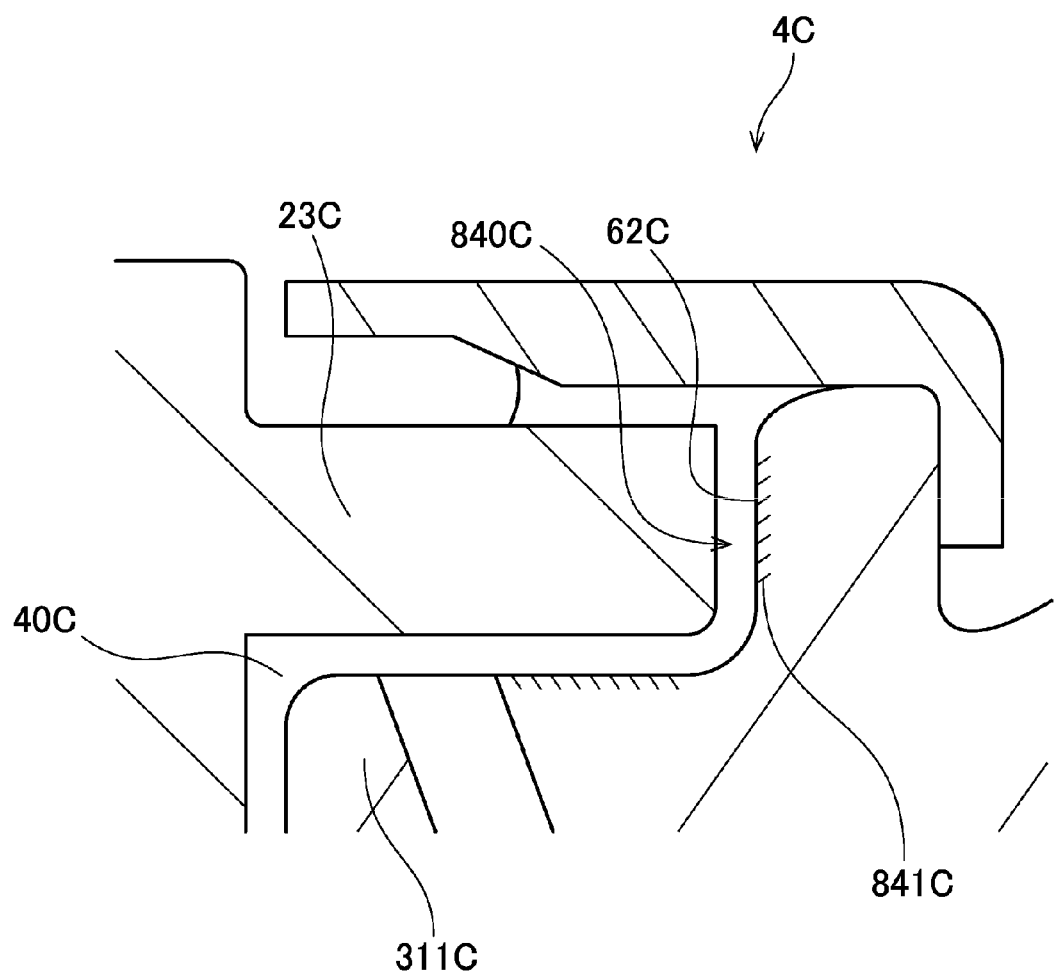
FIG. 13 is a partial vertical cross-sectional view of a fluid dynamic bearing apparatus according to a modification of the second preferred embodiment of the present invention.

FIG. 13 is a partial vertical cross-sectional view of a fluid dynamic bearing apparatus 4C according to another modification of the second preferred embodiment of the present invention. In the modification illustrated in FIG. 13, a second inner circumferential surface 62C of a sleeve 311C preferably includes a second pumping groove array 841C. Once a spindle motor is started, the sleeve 311C rotates in one direction with respect to an upper annular portion 23C. The second pumping groove array 841C is arranged to send a portion of a lubricating oil 40C which is present between the upper annular portion 23C and the second inner circumferential surface 62C downward at this time. That is, in the modification illustrated in FIG. 13, a second pumping seal portion 840C arranged to send the lubricating oil 40C downward is preferably defined between an outer circumferential surface of the upper annular portion 23C, which is a surface in a stationary portion, and the second inner circumferential surface 62C, which is a surface in a rotating portion.

Also in the modification illustrated in FIG. 13, as compared to the case where the first and second pumping groove arrays are defined in a single continuous flat surface, a reduction in the distance between each pumping groove array and the central axis is achieved while sufficient effects of pumping seals are secured. Moreover, since the width of a radial gap does not change as easily as the width of an axial gap, it is preferably possible to bring the outer circumferential surface of the upper annular portion 23C and the second inner circumferential surface 62C closer to each other to increase a force caused by the second pumping groove array 841C to draw the lubricating oil 40C toward an interior of the bearing apparatus. Note that the second pumping groove array 841C may be defined in the outer circumferential surface of the upper annular portion 23C.

Figure 14:
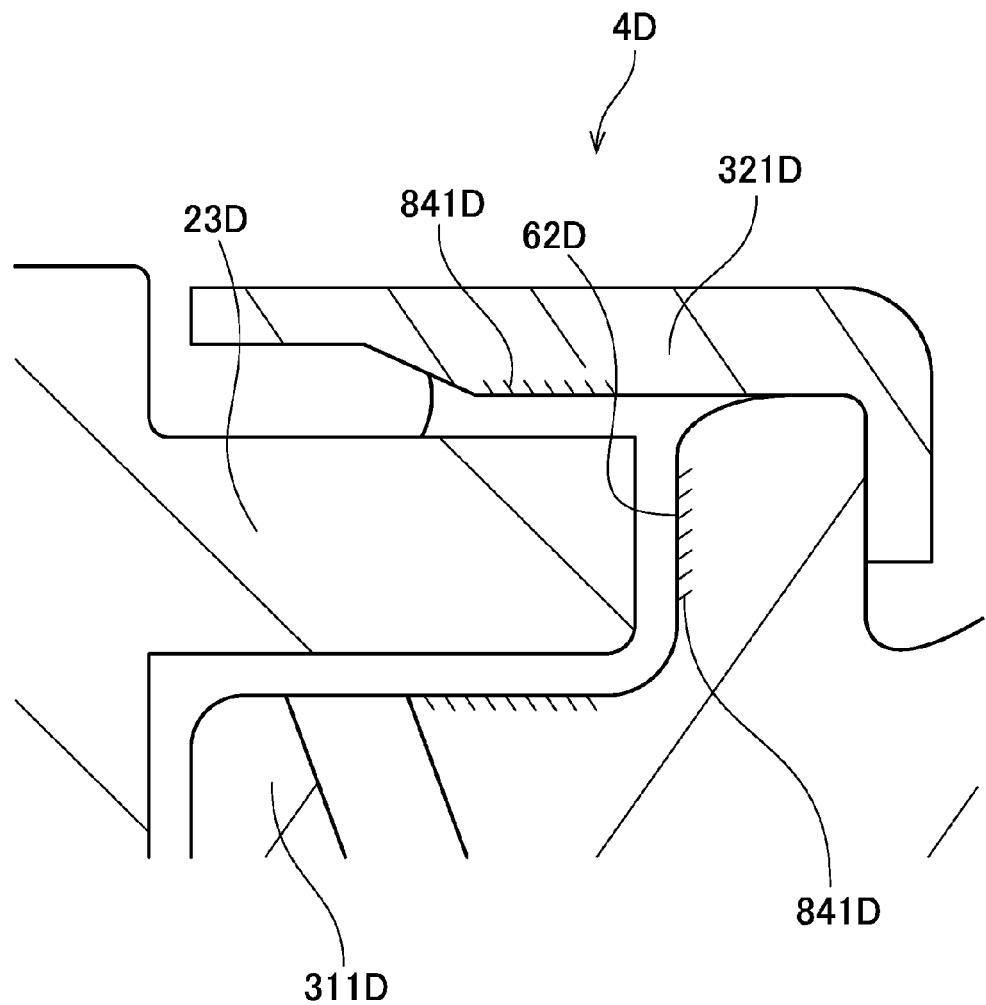
FIG. 14 is a partial vertical cross-sectional view of a fluid dynamic bearing apparatus according to a modification of the second preferred embodiment of the present invention.

FIG. 14 is a partial vertical cross-sectional view of a fluid dynamic bearing apparatus 4D according to another modification of the second preferred embodiment of the present invention. In the modification illustrated in FIG. 14, two second pumping groove arrays 841D are preferably defined in a lower surface of a cap plate portion 321D and a second inner circumferential surface 62D of a sleeve 311D, respectively. When the second pumping groove arrays 841D are provided at a plurality of locations as described above, the second pumping groove arrays 841D are able to produce an increased force to draw a lubricating oil 40D toward an interior of the bearing apparatus. Note that the second pumping groove arrays 841D may alternatively be defined in an upper surface of an upper annular portion 23D and an outer circumferential surface of the upper annular portion 23D, respectively.

Figure 15:
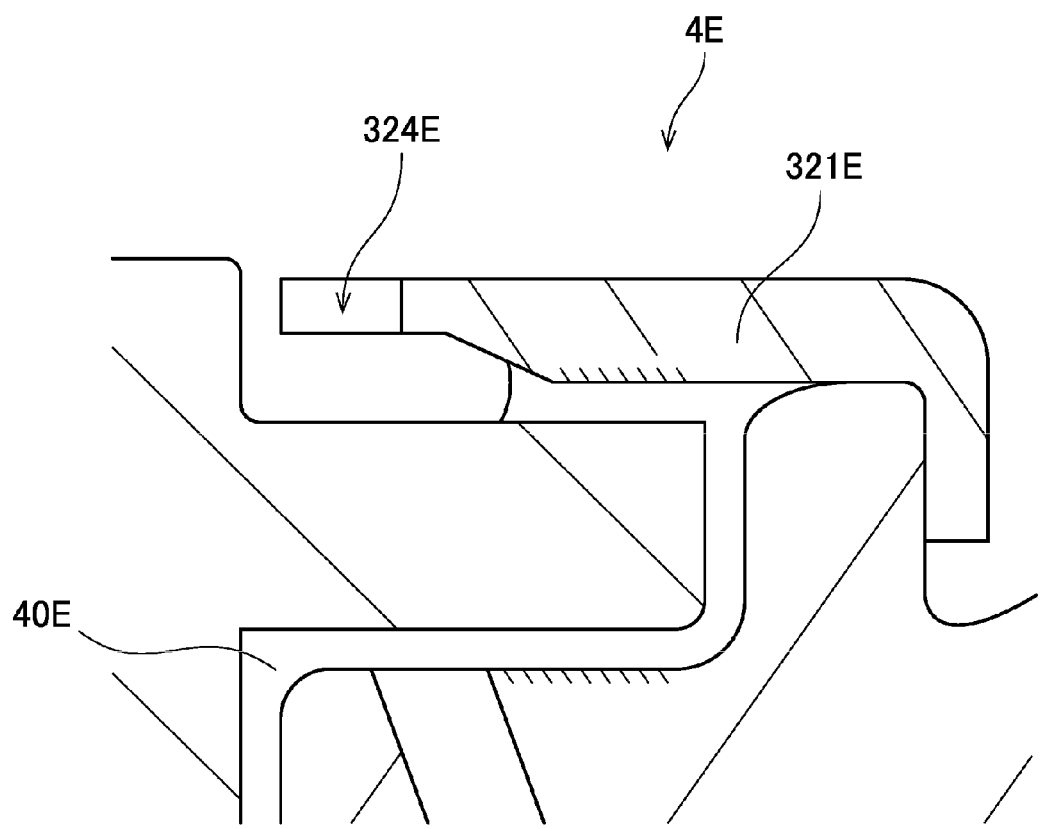
FIG. 15 is a partial vertical cross-sectional view of a fluid dynamic bearing apparatus according to a modification of the second preferred embodiment of the present invention.

FIG. 15 is a partial vertical cross-sectional view of a fluid dynamic bearing apparatus 4E according to another modification of the second preferred embodiment of the present invention. In the modification illustrated in FIG. 15, an inner circumferential portion of a cap plate portion 321E preferably includes a cut 324E defined therein. This makes it possible to inject a lubricating oil 40E into the fluid dynamic bearing apparatus 4E easily through the cut 324E when the fluid dynamic bearing apparatus 4E is manufactured. Note that the cap plate portion 321E may alternatively include, instead of the cut 324E, a through hole, for example, through which the lubricating oil 40E can be injected into the fluid dynamic bearing apparatus 4E.

Figure 16:
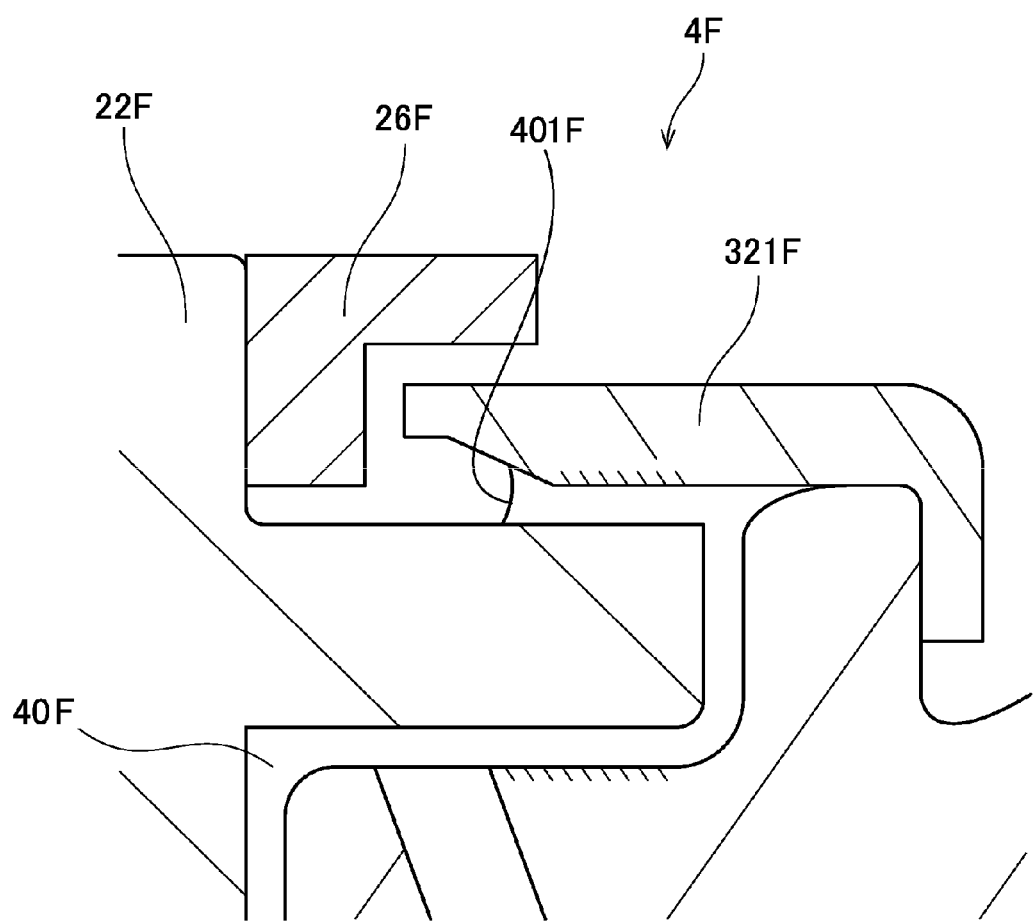
FIG. 16 is a partial vertical cross-sectional view of a fluid dynamic bearing apparatus according to a modification of the second preferred embodiment of the present invention.

FIG. 16 is a partial vertical cross-sectional view of a fluid dynamic bearing apparatus 4F according to another modification of the second preferred embodiment of the present invention. In the modification illustrated in FIG. 16, the radial distance between an outer circumferential surface of a stationary shaft 22F and an inner circumferential portion of a cap plate portion 321F is preferably longer than the radial distance between the outer circumferential surface of the stationary shaft 22 and the inner circumferential portion of the cap plate portion 321 according to the second preferred embodiment. This makes it possible to inject a lubricating oil 40F into the fluid dynamic bearing apparatus 4F easily through a gap between the outer circumferential surface of the stationary shaft 22F and the inner circumferential portion of the cap plate portion 321F when the fluid dynamic bearing apparatus 4F is manufactured. In addition, an auxiliary cap member 26F is preferably fixed to the outer circumferential surface of the stationary shaft 22F after injection of the lubricating oil 40F. The auxiliary cap member 26F and the cap plate portion 321F are arranged adjacent to each other with a slight gap defined therebetween. This contributes to reducing evaporation of the lubricating oil 40F through an upper surface 401F of the lubricating oil 40F.

Note that a lower opening of a communicating hole may alternatively be defined in an outer circumferential surface of a sleeve in another modification of the second preferred embodiment of the present invention. That is, it is enough that the communicating hole should be arranged to connect an upper opening defined in an upper surface of the sleeve and a lower opening defined below the upper opening with each other. Also note that the sleeve may include a plurality of communicating holes if so desired.

Also note that the preferred embodiments of the present invention and modifications thereof are also applicable to spindle motors arranged to rotate disks other than magnetic disks, such as optical disks.

Features of the above-described preferred embodiments and the modifications thereof may be combined appropriately as long as no conflict arises.

The preferred embodiments of the present invention and the modifications thereof are applicable to bearing apparatuses, spindle motors, and disk drive apparatuses.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:
1. A bearing apparatus comprising:
a stationary shaft arranged to extend along a central axis extending in a vertical direction;
an upper annular portion having a circular or substantially circular ring shape, and arranged to project radially outward from the stationary shaft;
a lower annular portion having a circular or substantially circular ring shape, and arranged to project radially outward from the stationary shaft below the upper annular portion;
a sleeve arranged between the upper and lower annular portions, and supported to be rotatable about the central axis;
a cap arranged above the upper annular portion, and arranged to rotate together with the sleeve; and
a lubricating oil arranged between a combination of the sleeve and the cap and a combination of the stationary shaft, the upper annular portion, and the lower annular portion; wherein
the lower annular portion includes:
a bottom plate portion arranged to extend in or substantially in a shape of a disk below the sleeve; and
a wall portion arranged to extend upward from the bottom plate portion to have a cylindrical or substantially cylindrical shape radially outside of the sleeve;
the sleeve includes:
a first inner circumferential surface arranged radially opposite to an outer circumferential surface of the stationary shaft;
a second inner circumferential surface arranged radially outside of the upper annular portion;
an upper surface arranged axially opposite to a lower surface of the upper annular portion;
a lower surface arranged axially opposite to an upper surface of the bottom plate portion; and
an outer circumferential surface arranged radially opposite to an inner circumferential surface of the wall portion;
an upper surface of the upper annular portion and a lower surface of the cap are arranged to together define an upper capillary seal portion arranged to gradually increase in axial dimension with decreasing distance from the central axis;
the outer circumferential surface of the sleeve and the inner circumferential surface of the wall portion are arranged to together define a lower capillary seal portion arranged to gradually increase in radial dimension with increasing height;
the sleeve includes an upper opening defined in the upper surface thereof, a lower opening defined below the upper opening, and a communicating hole arranged to connect the upper and lower openings with each other;
the lower surface of the sleeve and the upper surface of the bottom plate portion are arranged to together define a thrust dynamic pressure bearing portion therebetween;
the lower opening is arranged radially outward of an inner circumferential portion of the thrust dynamic pressure bearing portion;
a radially outer edge of the lower opening is arranged at a radial position overlapping with an outer circumferential portion of the thrust dynamic pressure bearing portion, or radially outward of the outer circumferential portion of the thrust dynamic pressure bearing portion;
at least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during rotation of the sleeve;

one of the upper surface of the sleeve and the lower surface of the upper annular portion includes a first pumping groove array arranged to send the lubricating oil radially inward;

one of the lower surface of the cap, the upper surface of the upper annular portion, the second inner circumferential surface, and an outer circumferential surface of the upper annular portion includes a second pumping groove array arranged to send the lubricating oil radially outward or axially downward, the second pumping groove array being arranged radially outward of the upper capillary seal portion;

the upper opening is arranged radially inward of a radially outer end portion of the first pumping groove array; and both an axial distance between the first pumping groove array and a surface opposed thereto and a distance between the second pumping groove array and a surface opposed thereto are longer than an axial dimension of the thrust dynamic pressure bearing portion.

2. The bearing apparatus according to claim 1, wherein the second pumping groove array is defined in one of the lower surface of the cap and the upper surface of the upper annular portion.

3. The bearing apparatus according to claim 1, wherein the second pumping groove array is defined in one of the second inner circumferential surface and the outer circumferential surface of the upper annular portion.

4. The bearing apparatus according to claim 1, wherein
the lower surface of the upper annular portion and the upper surface of the sleeve are arranged to together define a first pumping seal portion; and
when the sleeve is rotating at a rated speed, an upper surface of the lubricating oil is located in the first pumping seal portion, and at least a portion of the first pumping groove array is exposed out of the lubricating oil.

5. The bearing apparatus according to claim 4, wherein the upper surface of the lubricating oil is located radially outward of the upper opening of the communicating hole when the sleeve is rotating at the rated speed.

6. The bearing apparatus according to claim 1, wherein an axial distance between at least an outer portion of the lower surface of the upper annular portion and at least an outer portion of the upper surface of the sleeve is arranged to gradually increase with increasing distance from the central axis.

7. The bearing apparatus according to claim 1, wherein an upper surface of the lubricating oil is located radially outward of the upper opening of the communicating hole when the sleeve is rotating at a rated speed.

8. The bearing apparatus according to claim 1, wherein
a gap between the lower surface of the sleeve and the upper surface of the bottom plate portion includes a wide gap portion arranged radially outward of the thrust dynamic pressure bearing portion, and arranged to have an axial dimension greater than that of the thrust dynamic pressure bearing portion; and
the lower opening of the communicating hole is arranged to be open toward the wide gap portion.

9. The bearing apparatus according to claim 1, wherein
the lower capillary seal portion includes a margin portion arranged above a lower surface of the lubricating oil when the sleeve is in a stationary state; and
the margin portion is arranged to have a capacity greater than a volume of a portion of the lubricating oil which is held in the upper capillary seal portion when the sleeve is in the stationary state.

10. The bearing apparatus according to claim 1, further comprising oil-repellent films arranged to cover a surface of the sleeve and a surface of the wall portion above a lower surface of the lubricating oil; wherein
the lower annular portion includes an annular groove defined in the inner circumferential surface of the wall portion; and
each oil-repellent film is arranged above the annular groove.

11. The bearing apparatus according to claim 1, wherein the cap includes a cut or a through hole passing therethrough in an axial direction.

12. The bearing apparatus according to claim 1, wherein the first pumping groove array is a groove array arranged in a spiral pattern in a plan view.

13. The bearing apparatus according to claim 1, wherein
the first pumping groove array includes a plurality of grooves, every adjacent pair of the plurality of grooves of the first pumping groove array including a first hill surface defined therebetween;
the second pumping groove array includes a plurality of grooves, every adjacent pair of the plurality of grooves of the second pumping groove array including a second hill surface defined therebetween;
the thrust dynamic pressure groove array includes a plurality of grooves, every adjacent pair of the plurality of grooves of the thrust dynamic pressure groove array including a third hill surface defined therebetween; and
each of the first and second hill surfaces is arranged to have a circumferential width smaller than that of the third hill surface.

14. A spindle motor comprising:
a bearing apparatus including:
a stationary shaft arranged to extend along a central axis extending in a vertical direction;
an upper annular portion having a circular or substantially circular ring shape, and arranged to project radially outward from the stationary shaft;
a lower annular portion having a circular or substantially circular ring shape, and arranged to project radially outward from the stationary shaft below the upper annular portion;
a sleeve arranged between the upper and lower annular portions, and supported to be rotatable about the central axis;
a cap arranged above the upper annular portion, and arranged to rotate together with the sleeve; and
a lubricating oil arranged between a combination of the sleeve and the cap and a combination of the stationary shaft, the upper annular portion, and the lower annular portion; wherein
the lower annular portion includes:
a bottom plate portion arranged to extend in or substantially in a shape of a disk below the sleeve; and
a wall portion arranged to extend upward from the bottom plate portion to have a cylindrical or substantially cylindrical shape radially outside of the sleeve;
the sleeve includes:
a first inner circumferential surface arranged radially opposite to an outer circumferential surface of the stationary shaft;
a second inner circumferential surface arranged radially outside of the upper annular portion;
an upper surface arranged axially opposite to a lower surface of the upper annular portion;

a lower surface arranged axially opposite to an upper surface of the bottom plate portion; and an outer circumferential surface arranged radially opposite to an inner circumferential surface of the wall portion;

an upper surface of the upper annular portion and a lower surface of the cap are arranged to together define an upper capillary seal portion arranged to gradually increase in axial dimension with decreasing distance from the central axis;

the outer circumferential surface of the sleeve and the inner circumferential surface of the wall portion are arranged to together define a lower capillary seal portion arranged to gradually increase in radial dimension with increasing height;

the sleeve includes an upper opening defined in the upper surface thereof, a lower opening defined below the upper opening, and a communicating hole arranged to connect the upper and lower openings with each other;

the lower surface of the sleeve and the upper surface of the bottom plate portion are arranged to together define a thrust dynamic pressure bearing portion therebetween;

the lower opening is arranged radially outward of an inner circumferential portion of the thrust dynamic pressure bearing portion;

a radially outer edge of the lower opening is arranged at a radial position overlapping with an outer circumferential portion of the thrust dynamic pressure bearing portion, or radially outward of the outer circumferential portion of the thrust dynamic pressure bearing portion;

at least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during rotation of the sleeve;

one of the upper surface of the sleeve and the lower surface of the upper annular portion includes a first pumping groove array arranged to send the lubricating oil radially inward;

one of the lower surface of the cap, the upper surface of the upper annular portion, the second inner circumferential surface, and an outer circumferential surface of the upper annular portion includes a second pumping groove array arranged to send the lubricating oil radially outward or axially downward, the second pumping groove array being arranged radially outward of the upper capillary seal portion;

the upper opening is arranged radially inward of a radially outer end portion of the first pumping groove array; and both an axial distance between the first pumping groove array and a surface opposed thereto and a distance between the second pumping groove array and a surface opposed thereto are longer than an axial dimension of the thrust dynamic pressure bearing portion;

a stationary portion including the stationary shaft, the upper annular portion, and the lower annular portion;

a rotating portion including a support portion arranged to support a disk, the sleeve, and the cap, and supported to be rotatable with respect to the stationary portion through the bearing apparatus; and a stator and a magnet arranged to produce a torque centered on the central axis between the stationary and rotating portions.

15. The spindle motor according to claim 14, further comprising a labyrinth seal portion defined between the stationary and rotating portions and arranged radially outward of the lower capillary seal portion, wherein a distance between the stationary and rotating portions is shorter at the labyrinth seal portion than at the lower capillary seal portion.

16. A disk drive apparatus comprising:
a spindle motor including:
a bearing apparatus including:
a stationary shaft arranged to extend along a central axis extending in a vertical direction;

an upper annular portion having a circular or substantially circular ring shape, and arranged to project radially outward from the stationary shaft;

a lower annular portion having a circular or substantially circular ring shape, and arranged to project radially outward from the stationary shaft below the upper annular portion;

a sleeve arranged between the upper and lower annular portions, and supported to be rotatable about the central axis;

a cap arranged above the upper annular portion, and arranged to rotate together with the sleeve; and a lubricating oil arranged between a combination of the sleeve and the cap and a combination of the stationary shaft, the upper annular portion, and the lower annular portion; wherein the lower annular portion includes:
a bottom plate portion arranged to extend in or substantially in a shape of a disk below the sleeve; and a wall portion arranged to extend upward from the bottom plate portion to have a cylindrical or substantially cylindrical shape radially outside of the sleeve;

the sleeve includes:
a first inner circumferential surface arranged radially opposite to an outer circumferential surface of the stationary shaft;

a second inner circumferential surface arranged radially outside of the upper annular portion;

an upper surface arranged axially opposite to a lower surface of the upper annular portion;

a lower surface arranged axially opposite to an upper surface of the bottom plate portion; and an outer circumferential surface arranged radially opposite to an inner circumferential surface of the wall portion;

an upper surface of the upper annular portion and a lower surface of the cap are arranged to together define an upper capillary seal portion arranged to gradually increase in axial dimension with decreasing distance from the central axis;

the outer circumferential surface of the sleeve and the inner circumferential surface of the wall portion are arranged to together define a lower capillary seal portion arranged to gradually increase in radial dimension with increasing height;

the sleeve includes an upper opening defined in the upper surface thereof, a lower opening defined below the upper opening, and a communicating hole arranged to connect the upper and lower openings with each other;

the lower surface of the sleeve and the upper surface of the bottom plate portion are arranged to together define a thrust dynamic pressure bearing portion therebetween;

the lower opening is arranged radially outward of an inner circumferential portion of the thrust dynamic pressure bearing portion;

a radially outer edge of the lower opening is arranged at a radial position overlapping with an outer circumferential portion of the thrust dynamic pressure bearing portion, or radially outward of the outer circumferential portion of the thrust dynamic pressure bearing portion;

at least one of the lower surface of the sleeve and the upper surface of the bottom plate portion which together define the thrust dynamic pressure bearing portion includes a thrust dynamic pressure groove array arranged to draw a portion of the lubricating oil which is present between the sleeve and the bottom plate portion radially inward during rotation of the sleeve;

one of the upper surface of the sleeve and the lower surface of the upper annular portion includes a first pumping groove array arranged to send the lubricating oil radially inward;

one of the lower surface of the cap, the upper surface of the upper annular portion, the second inner circumferential surface, and an outer circumferential surface of the upper annular portion includes a second pumping groove array arranged to send the lubricating oil radially outward or axially downward, the second pumping groove array being arranged radially outward of the upper capillary seal portion;

the upper opening is arranged radially inward of a radially outer end portion of the first pumping groove array; and both an axial distance between the first pumping groove array and a surface opposed thereto and a distance between the second pumping groove array and a surface opposed thereto are longer than an axial dimension of the thrust dynamic pressure bearing portion;

a stationary portion including the stationary shaft, the upper annular portion, and the lower annular portion;

a rotating portion including a support portion arranged to support a disk, the sleeve, and the cap, and supported to be rotatable with respect to the stationary portion through the bearing apparatus; and a stator and a magnet arranged to produce a torque centered on the central axis between the stationary and rotating portions;

an access portion arranged to perform at least one of reading and writing of information from or to the disk supported by the rotating portion of the spindle motor; and a housing arranged to contain the spindle motor and the access portion.

\* \* \* \* \*